US008453175B2

(12) United States Patent
Reid et al.

(10) Patent No.: US 8,453,175 B2
(45) Date of Patent: May 28, 2013

(54) SYSTEM FOR PRESENTATION OF MULTIMEDIA CONTENT

(75) Inventors: Duane M. Reid, San Rafael, CA (US); James P. Theberge, Livermore, CA (US); Noel J. Rubin, Calgary (CA)

(73) Assignee: Eat.tv, LLC, San Rafael, CA (US)

( * ) Notice: Subject to any disclaimer, the term of this patent is extended or adjusted under 35 U.S.C. 154(b) by 841 days.

(21) Appl. No.: 10/856,200

(22) Filed: May 28, 2004

(65) Prior Publication Data

US 2004/0268413 A1    Dec. 30, 2004

Related U.S. Application Data

(60) Provisional application No. 60/474,425, filed on May 29, 2003, provisional application No. 60/538,104, filed on Jan. 20, 2004.

(51) Int. Cl.
*G06F 3/00* (2006.01)
*G06F 13/00* (2006.01)
*H04N 5/445* (2011.01)
*H04N 21/482* (2006.01)
*H04N 21/85* (2006.01)

(52) U.S. Cl.
CPC .......... *H04N 21/4821* (2013.01); *H04N 21/85* (2013.01); *H04N 5/44543* (2013.01)
USPC ............... 725/45; 725/41; 725/42; 725/43; 725/47; 725/52

(58) Field of Classification Search
USPC ..................................... 725/39–55
See application file for complete search history.

(56) References Cited

U.S. PATENT DOCUMENTS

| 4,712,191 A | 12/1987 | Penna ......................... 364/900 |
| 4,751,578 A | 6/1988 | Reiter et al. .................. 358/183 |
| 4,914,516 A | 4/1990 | Duffield ....................... 358/183 |
| 5,038,211 A | 8/1991 | Hallenbeck .................. 358/142 |

(Continued)

FOREIGN PATENT DOCUMENTS

| EP | 0 676 705 | 10/1995 |
| EP | 0 883 055 | 9/1998 |
| EP | 1052849 A1 | 11/2000 |
| EP | 1 246 465 | 10/2002 |

OTHER PUBLICATIONS

"Sorting in XSLT" webpage. Jul. 3, 2002. Accessed Aug. 26, 2009. http://www.xml.com/lpt/a/991.*

(Continued)

*Primary Examiner* — Bennett Ingvoldstad
(74) *Attorney, Agent, or Firm* — Haverstock & Owens, LLP

(57) ABSTRACT

The multimedia content presentation system and method includes a preparation component, a deployment component, an interface component and a metrics component. Multimedia content assets and targeted advertising are placed by the preparation component with a hierarchal N×M matrix of display cells. The deployment component uses conventional transmission networks, such as the Internet, broadband cable and wireless phone systems to transmit to the interface component a configuration file defining a matrix of display tiles. The interface component presents and navigates the user through a hierarchy of display palettes, multimedia assets and targeted advertisements on a variety of platforms, such as televisions, personal computers, personal digital assistants and cell phones. The interface component further collects usage data and provides the data to the metrics component for use by the preparation component and the deployment component for targeted content and advertisements.

23 Claims, 17 Drawing Sheets

U.S. PATENT DOCUMENTS

| | | | | |
|---|---|---|---|---|
| 5,142,662 A | 8/1992 | Gump et al. | | 395/100 |
| 5,161,012 A | 11/1992 | Choi | | 358/183 |
| 5,181,273 A | 1/1993 | Ohtani | | 395/161 |
| 5,194,954 A | 3/1993 | Duffield | | 358/193.1 |
| 5,198,802 A | 3/1993 | Bertram et al. | | 340/709 |
| 5,235,509 A | 8/1993 | Mueller et al. | | 364/405 |
| 5,293,357 A | 3/1994 | Hallenbeck | | 348/734 |
| 5,297,253 A | 3/1994 | Meisel | | 395/160 |
| 5,353,401 A | 10/1994 | Iizawa et al. | | 395/161 |
| 5,398,074 A | 3/1995 | Duffield et al. | | 348/564 |
| 5,421,012 A | 5/1995 | Khoyi et al. | | 395/650 |
| 5,574,843 A | 11/1996 | Gerlach, Jr. | | |
| 5,602,596 A * | 2/1997 | Claussen et al. | | 725/37 |
| 5,731,844 A | 3/1998 | Rauch et al. | | 348/563 |
| 5,734,720 A | 3/1998 | Salganicoff | | 380/20 |
| 5,822,014 A | 10/1998 | Steyer et al. | | |
| 5,926,230 A | 7/1999 | Niijima | | |
| 6,011,537 A | 1/2000 | Slotznick | | |
| 6,021,433 A | 2/2000 | Payne et al. | | 709/219 |
| 6,151,059 A | 11/2000 | Schein et al. | | 725/37 |
| 6,253,375 B1 | 6/2001 | Gordon et al. | | |
| 6,288,708 B1 | 9/2001 | Stringer | | 345/169 |
| 6,295,055 B1 | 9/2001 | Miller et al. | | 345/326 |
| 6,342,901 B1 | 1/2002 | Adler et al. | | 345/700 |
| 6,353,448 B1 | 3/2002 | Scarborough et al. | | 345/744 |
| 6,448,987 B1 | 9/2002 | Easty et al. | | 345/834 |
| 6,469,719 B1 | 10/2002 | Kino et al. | | 345/810 |
| 6,484,189 B1 | 11/2002 | Gerlach, Jr. et al. | | 707/500.1 |
| 6,493,006 B1 | 12/2002 | Gourdol et al. | | 345/825 |
| 6,507,352 B1 | 1/2003 | Cohen et al. | | 345/817 |
| 6,549,219 B2 | 4/2003 | Selker | | 345/834 |
| 6,600,503 B2 | 7/2003 | Stautner et al. | | 345/854 |
| 6,608,633 B1 | 8/2003 | Sciammarella et al. | | 345/700 |
| 6,731,316 B2 | 5/2004 | Herigstad et al. | | 345/864 |
| 6,760,917 B2 | 7/2004 | De Vos et al. | | |
| 2001/0010095 A1 | 7/2001 | Ellis et al. | | 725/44 |
| 2001/0045965 A1 | 11/2001 | Orbanes et al. | | 345/841 |
| 2001/0047302 A1 | 11/2001 | Yoshinaga et al. | | 705/15 |
| 2001/0054183 A1 | 12/2001 | Curreri | | 725/56 |
| 2002/0016961 A1 | 2/2002 | Goode | | |
| 2002/0030843 A1 | 3/2002 | Tuli | | 358/1.15 |
| 2002/0038456 A1 | 3/2002 | Hansen et al. | | |
| 2002/0059604 A1 | 5/2002 | Papagan et al. | | 725/51 |
| 2002/0067376 A1 | 6/2002 | Martin et al. | | 345/810 |
| 2002/0078449 A1 | 6/2002 | Gordon et al. | | |
| 2002/0080188 A1 | 6/2002 | Somashekaraiah | | 345/810 |
| 2002/0097261 A1 | 7/2002 | Gottfurcht et al. | | |
| 2002/0100054 A1 | 7/2002 | Feinberg et al. | | |
| 2002/0100063 A1 | 7/2002 | Herigstad et al. | | 725/141 |
| 2002/0116235 A1 | 8/2002 | Grimm et al. | | 705/5 |
| 2002/0144268 A1 | 10/2002 | Khoo et al. | | 725/47 |
| 2002/0154692 A1 | 10/2002 | Martin | | 375/240.01 |
| 2002/0158895 A1 | 10/2002 | Murase et al. | | |
| 2002/0162108 A1 | 10/2002 | Lin-Hendel | | 725/52 |
| 2002/0166122 A1 | 11/2002 | Kikinis et al. | | |
| 2002/0169687 A1 | 11/2002 | Perkowski | | 705/26 |
| 2002/0184627 A1 | 12/2002 | Alba et al. | | 725/39 |
| 2002/0186621 A1 | 12/2002 | Lai | | 368/82 |
| 2002/0188960 A1 | 12/2002 | Rodriguez et al. | | 725/120 |
| 2003/0014758 A1 | 1/2003 | Kim | | 725/87 |
| 2003/0052905 A1 | 3/2003 | Gordon et al. | | 345/700 |
| 2003/0084449 A1 * | 5/2003 | Chane et al. | | 725/40 |
| 2003/0145323 A1 * | 7/2003 | Hendricks et al. | | 725/35 |
| 2003/0159143 A1 * | 8/2003 | Chan | | 725/41 |
| 2003/0169282 A1 | 9/2003 | Herigstad et al. | | 345/700 |
| 2004/0060061 A1 | 3/2004 | Parker | | |
| 2004/0199932 A1 * | 10/2004 | Gottfurcht et al. | | 725/52 |
| 2005/0060745 A1 | 3/2005 | Riedl et al. | | |
| 2006/0059525 A1 * | 3/2006 | Jerding et al. | | 725/45 |
| 2006/0206912 A1 * | 9/2006 | Klarfeld et al. | | 725/40 |
| 2007/0011702 A1 | 1/2007 | Vaysman | | |
| 2007/0186228 A1 | 8/2007 | Ramaswamy et al. | | |

OTHER PUBLICATIONS

Marston, Tony. "Generating dynamic web pages using XSL and XML" Feb. 1, 2003. http://web.archive.org/web/20030716124825/http://www.tonymarston.net/xml-xsl/xml-and-xsl.html.*

Oxford English Dictionary. "sort" definition. Accessed Feb. 26, 2011. www.oed.com.*

Foreign Office Action from the Canadian Intellectual Property Office, Application No. 2,527,328, Title: System for Presentation of Multimedia Content, Date Mailed: Nov. 5, 2009, pp. 4, Applicant: EAT.TV. Inc.

Japanese Patent Office, Foreign Office Action, Mail date: Jun. 8, 2010, Japanese Application No. 2006-533491, Applicant: EAT. TV, Inc., pp. 2.

European Search Report mailed Sep. 23, 2010, European Application No. 04753688.3, 6 pgs.

Office Action for Japanese Patent Application No. 2006-533491, mailed Oct. 29, 2010, translated, pp. 1-2.

European Office Action, Oct. 16, 2012, Application No. 04753688.3, pp. 1-5.

Canadian Intellectual Property Office, Office Action mailed on Mar. 14, 2011, for Canadian Application No. 2,527,328, 4 pgs.

Patent Examiner for the Japanese Patent Office, Office Action issued Aug. 5, 2011 for Japanese patent application No. 2007-539191 (4 pages total—including 2 pages a translated version of the Office Action).

* cited by examiner

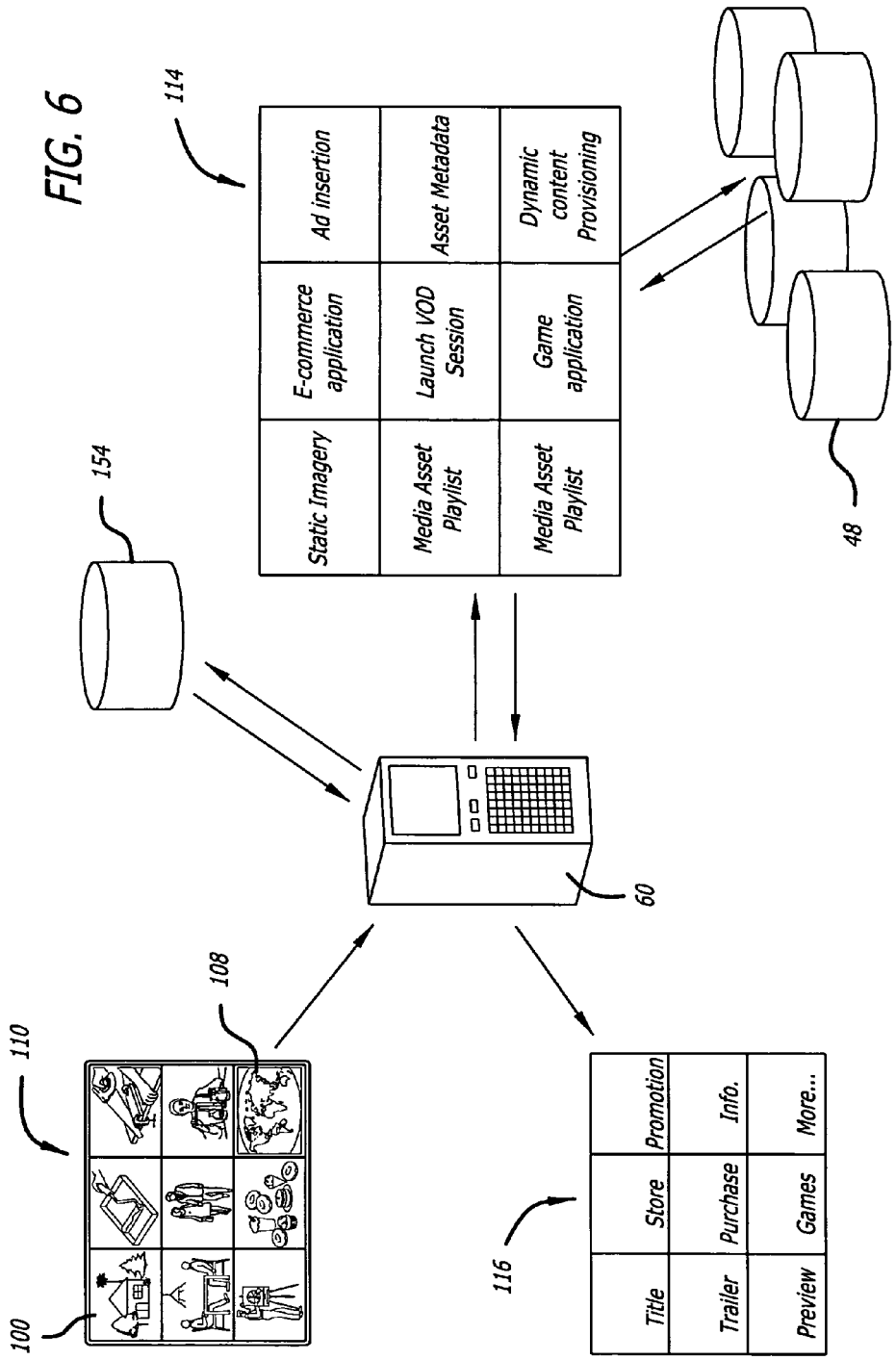

FIG. 20

```
/* Specify unique identifier for the NxM matrix */
<matrix id="abc123?">
    /* Specify non-standard transition animation type associated with matrix */
    <a type="interstitial_transition_vertical"/>
    /* Specify additional advertising interstitial transition type and URL associated with matrix */
    <a type="advertising_transition" href="advertisement_URL"/>
    /* Specify display cell properties for hierarchical transition to new NxM matrix */
    <displayCell row="1" column="1" noFocusSrc="image_URL" focusSrc="image_URL" imageOverlayText="abc?">
        <a id="abc123?" href="matrix_configuration_URL" type="matrix"/>
    </displayCell>
    /* Specify display cell properties for playing a list of associated multimedia assets */
    <displayCell row="1" column="2" noFocusSrc="image_URL" focusSrc="image_URL" imageOverlayText="abc?">
        <a id="" href="media_playlist_URL" type="mediaPlayer" title="abc?" description="abc?"/>
    </displayCell>
    /* Specify display cell properties for provisioning a pre-defined content template */
    <displayCell row="1" column="3" noFocusSrc="image_URL" focusSrc="image_URL" imageOverlayText="abc?">
        <a id="" href="provisioning_template_URL" type="template"/>
    </displayCell>
    /* Specify display cell properties for presenting an application */
    <displayCell row="1" column="4" noFocusSrc="image_URL" focusSrc="image_URL" imageOverlayText="abc?">
        <a id="" href="application_URL" type="application"/>
    </displayCell>
    /* Specify display cell properties for presenting an dynamically provisioned multimedia asset
       (e.g., advertisement from an ad-insertion system */
    <displayCell row="2" column="1" noFocusSrc="image_URL" focusSrc="image_URL" imageOverlayText="abc?">
        <a id="" href="dynamic_content_URL" type="mediaPlayer"/>
    </displayCell>
    . . .
    /* Specify display cell properties for NxMth display cell */
    <displayCell row="2" column="1" noFocusSrc="image_URL" focusSrc="image_URL" imageOverlayText="abc?">
        <a id="" href="media_playlist_URL" type="mediaPlayer" title="abc?" description="abc?"/>
    </displayCell>
</matrix>
```

SYSTEM FOR PRESENTATION OF MULTIMEDIA CONTENT

CROSS-REFERENCES TO RELATED APPLICATIONS

This application claims the benefit of U.S. Provisional Application Ser. No. 60/474,425, filed May 29, 2003 and U.S. Provisional Application Ser. No. 60/538,104, filed Jan. 20, 2004, the contents of each are hereby incorporated herein by reference.

BACKGROUND OF THE INVENTION

A system for the dynamic provisioning, presentation and measurement of multimedia content having a user interface that is simple, visual, hierarchical, contextual and scalable utilizing an identical viewer experience across content devices and platforms including, but not limited to, televisions (TV), personal computers (PC), personal digital assistants (PDA) and cell phones.

Multimedia content choices available to consumers have been increasing at an explosive rate over the past few years. Examples of such rapidly increasing choices include: (i) the number of broadcast television channels expanding from just over 60 channels at the beginning of the 1990s to well over 300 channel choices in this past year of 2003; (ii) the number of on-demand hours of programming content being offered by cable operators that is predicted to grow from an average of 1,500 hours at the beginning of 2004 to well over 10,000 hours by the end of 2004; and (iii) the increased penetration of broadband connections in consumers' homes that provide immediate access to vast arrays of video and audio selections from hundreds of thousands of content providers. These are just a few examples of the vast amount of multimedia choices consumers must make in their daily lives. As multimedia content offerings increase, so does the need for providing a more efficient and elegant navigation mechanism for the vast array of multimedia choices available.

Until now, one means of navigating through multimedia content has been through an electronic programming guide, or "EPG." The current generation of EPGs incorporates a grid of textual line items to represent multimedia content. These text-grids were primarily developed to present a limited number of broadcast television channels to viewers and the designers did not contemplate an effective presentation paradigm for hundreds of broadcast channel choices and tens of thousands of hours of on-demand entertainment. In addition, due to the textual (rather than image-based) nature of today's EPGs, multimedia content providers are not obtaining the promotional capabilities they need to stimulate the take-rate levels required to make their paid entertainment services successful. As a result, the need has arisen for an improved multimedia navigation paradigm—one that is as much efficient and scalable as it is enjoyable and entertaining.

Another reason that the current state of the art is deficient is that it does not accommodate the way that the human brain processes multimedia choice data. Brain research has determined that the left hemisphere of the brain is the seat of language and processes sensory and abstract data in a logical and sequential order, while the right hemisphere is more visual and processes sensory and abstract data intuitively, emotionally, and randomly. Viewing television is primarily a right-brain experience—highly visual and immersive. However, selecting what to watch is, for the most part, a unilateral left-brain activity—sequential, logical, and linear. This split-brain conflict is resolved either by evaluating programming schedules and content descriptions (left-brain) or by channel "surfing"—streaming a series of rapidly changing images until a "stop and investigate" association is made (right-brain.) The left-brain interprets each potential viewing experience by theme preference, viewing time commitment, program tile recognition, cast composition, critical review, and possibly the tastes of other viewers in the room. The result of this decision-making is then handed off to the right brain as being "the best thing to watch."

If the right-brain can engage and associate with the material, the viewer watches. If not, the left-brain takes over and the process is repeated. When the left-brain tires of trying to please the right-brain, it "opts out" of the process and lets the right-brain "channel surf" until an intuitive association is made with an image, situation, or music. Curiously, this is what the right-brain wanted all along. Imposing logical, linear, decision-making on right-brain instincts produces confusion. The majority of entertainment seeking people are unable to appreciate that their intuitive, associative abilities are essential to enjoy the experiences they crave.

A system and method has previously been disclosed for navigating a complex structure at an interactive user station. The complex structure includes a plurality of nodes and each node includes at least one presentation element. The interactive user station includes a processor, a memory, and a presentation device. The presentation device includes a plurality of presentation cells arranged in an array, such as a 3×3 matrix of cells. The method disclosed includes providing at least one presentation element associated with a first node at the presentation cells. The method further includes receiving a signal at the processor indicating a user selection of a presentation cell. In addition, the method includes the step of identifying a second node based on the selected presentation cell. The method finally includes the step of presenting at least one presentation element associated with the second node at the presentation device. That system and method has many deficiencies, including being limited to non-dynamic presentations in a kiosk-type environment.

Additional deficiencies of such prior art systems include: (i) no configurability through a system that enables the creation of an N×M hierarchical matrix of multimedia display cells and its associated navigational schema; (ii) no ability to schedule multiple differing presentations of content through a system; (iii) no ability to record and store N×M hierarchical matrix navigational and multimedia content consumption statistics; and (iv) no navigation bar that present the users with useful options such as help and error functions, multimedia controls and dynamic media asset information. In addition, such prior art systems lack (i) transitional animations to give the user a sense of spatial context; (ii) the ability to dynamically provision content within a display cell or N×M matrix of display cells; (iii) a mechanism for drawing the attention of the user to the content choice being made through the use of the duotone and full-color swappable images that are displayed within a display cell in mutual exclusion to each other upon an input device focal event (i.e., display cell obtains focus and full color image is displayed, display cell loses focus and duotone image is displayed); and (iv) expanding and contracting display cells that form the viewport for the multimedia asset playlist in a contextual manner depending upon the location of the display cell chosen within an N×M matrix. Furthermore, prior art user interface systems have no transitional animations utilized for advertising purposes (e.g., company logos and product trademarks), and do not provide the capability for full screen display of multimedia content when so desired by the user.

Accordingly, what is needed and heretofore unavailable is a multimedia content interface system that eliminates the split-brained conflict by presenting programming and navigation choices as engaging right-brain entertainment activity. Furthermore, there has been a long-felt need for an improved multimedia navigation system that is efficient and scalable with enhancements that address the deficiencies discussed above.

SUMMARY OF THE INVENTION

The multimedia content presentation system of the present invention includes four main segments, the preparation component, the deployment component, the interface component and the metrics component. The system is a multimedia entertainment and advertising presentation and promotion technology that allows viewers to determine the course of their entertainment experience and to determine the advertisements that are presented to them. Relevant entertainment segments and targeted advertising are positioned within the user interface hierarchy based upon a configuration file. The centerpiece of the multimedia system is an N×M hierarchical matrix of multimedia display cells (tiles) that offers a highly efficient and enjoyable navigation mechanism for the multitudes of multimedia content choices facing today's consumers. The current state of the art multimedia content presentation systems rely upon a grid-based text list representation of multimedia assets that does not offer the exponential multimedia content sorting capabilities that an N×M hierarchical matrix of multimedia display cells offers.

Additional features of the multimedia content presentation system 30 of the present invention include the ability to combine media types together in a seamless fashion, and the ability to sell digital video assets directly next to hard goods next to audio or text. Additionally, the system may be configured to incorporate, combine and embed all multimedia application types currently on the market and yet to be designed, e.g., HTML, DHTML, SHOCKWAVE, WINDOWS MEDIA PLAYER, FLASH PLAYER, REAL PLAYER, etc. and any other multimedia animation based applications. The multimedia system may also be configured to be compatible with any video-on-demand (VOD) servers currently available and yet to be developed. Furthermore the multimedia system provides a single, application agnostic interface for all devices. The interface component of the multimedia system is designed to be compatible with all current multimedia devices, e.g., TV, VCR, DVD. Custom remote control wands are interfaced by using standard reference numbers so as to utilize mapping and universal keystrokes, arrows and buttons, e.g., HOME, NEXT, BACK, BUY, INFORMATION, MENU. The multimedia content presentation system is designed to reinforce complete accessibility such that no persons with a handicap would be eliminated from using the system, e.g., the sight impaired or blind, non-English speaking/reading, cognitive dysfunctional, children, the elderly and the mental dysfunctional.

In addition, through the use of images presented within the display cells of the N×M hierarchical matrix, enhanced multimedia content promotional capabilities are enabled by an N×M hierarchical matrix of multimedia display cells. In today's current state of the art multimedia content presentation systems, textual data is utilized in a line-item format to describe the multimedia content choices available to a user. The system and method of the present invention relies upon image-based representations of multimedia content choices within an N×M matrix.

The present multimedia content presentation system replaces the currently available content-based text instructions with context-specific spatial navigation. Using a matrix of imaged tiles allows the user to know exactly where he or she is in a group of choices or processes. Once inside this system, the user can imply the context instantly by a glance at the visual displays, logos, tiles, still frames, categories, products, steps, schedules or purchases. The present multimedia content presentation system navigation provides a right brain "choice environment" where less left-brain decision-making structure is needed by the user to access desired choices or processes. The major benefit of this right-brain dominance is simplified choices, easily understandable navigation, and an engaging, entertaining context.

After one session of media searching and viewing using the multimedia content presentation system of the present invention, the interface becomes intuitive and invisible by becoming the entertainment experience. The system was designed with these principles: (i) seamless melding of the left-brain and the right-brain functions; (ii) elimination of excess navigation function; (iii) reduction of input device options (1-9, home and back); (iv) onscreen, context-based, spatial navigation; and (v) use of visual cues and representations to convey context and location.

The preparation component is a tool set with an interface to a content management system that allows multimedia service providers to format multimedia and associated promotions for delivery and presentation within the multimedia content presentation system. The preparation component also provides for advertisement (ads) insertion within program segments, within display tiles, and within the hierarchical levels of the interface component. The output of preparation component is a configuration file used by the interface component.

The deployment component is a configuration file scheduling server that delivers multimedia content assets (e.g., display tiles & configuration files) into a network (e.g., Internet, television, or wireless network) for eventual reception and interpretation by a resident application that can exist on a personal computer (PC), television (TV) receiver, or mobile device (e.g., cell phone, pager, etc.). The deployment component also facilitates the automation of targeted content presentation (e.g., the delivery of targeted advertisement) within the interface component through an interface to the database maintained as part of the metrics component.

The interface component is a multimedia entertainment and advertising presentation and promotion system with targeted ad-insertion capabilities that allows viewers to determine the course of their entertainment experience. Relevant entertainment segments and targeted advertising are presented through the interface component based upon a configuration file that can be tailored to audience demographics and media consumption behavior. The interface component has many applications including: (i) pre-entertainment promotion and audience attraction (e.g., promotional network application); (ii) entertainment presentation & audience content targeting and localization (e.g., syndicated and local programming); (iii) post-entertainment extension and audience retention (e.g., bonus material and video-on-demand); (iv) audience capture and conversion (e.g., e-commerce, viewer usage data capture); and (v) viewer localization (e.g., local portal). The interface component displays and promotes content identically within an N×M (e.g., 3×3, 5×7) matrix of display tiles. Each N×M matrix of display tiles comprises a display palette. A navigation bar may be positioned underneath a display palette, slide up and into the display palette or otherwise appear in association with the display palette. The prime function of the navigation bar is to aid the user with navigational cues, multimedia controls and help options.

The metrics component is an interface component usage and content consumption measurement tool that allows entertainment companies and advertisers to collect anonymous aggregated system usage and media consumption statistics on their audience. This information includes: what media navigation pathways are utilized most often, what user interface components are utilized most often, when a viewer has opted into a program/advertising segment, the average time spent on each program/advertisement, which programs/advertisements were most watched, how many viewers accessed a program segment, as well as when and how often. The information provided by the metrics component allows entertainment and advertising providers to hone their effectiveness at retaining viewers and generating qualified impressions.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 6 is a schematic representation of one embodiment of the deployment component of the multimedia content presentation system of the present invention.

FIG. 20 depicts one embodiment of a configuration file used within the multimedia content presentation system of the present invention.

DETAILED DESCRIPTION OF THE INVENTION

Figure 1:
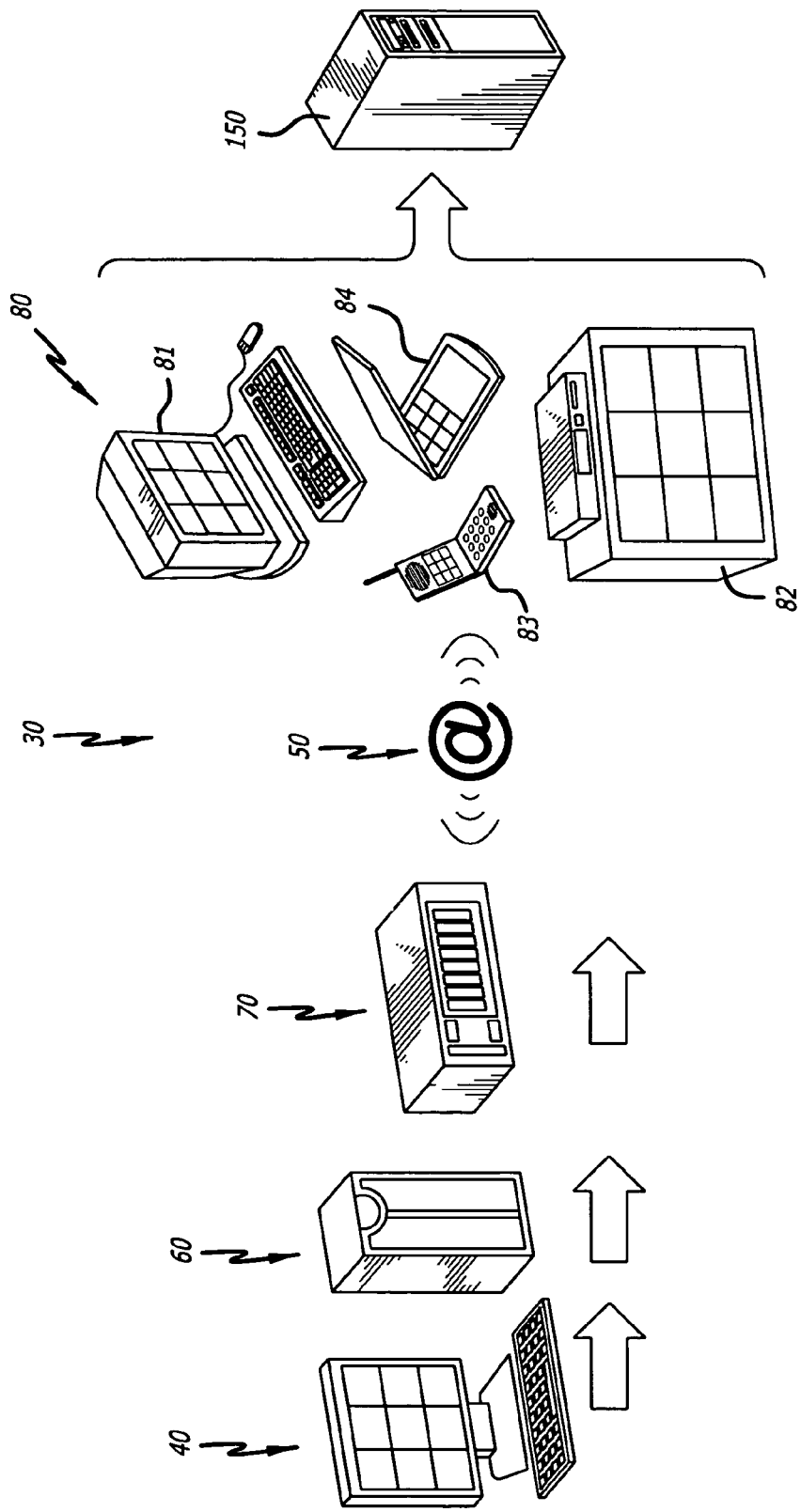
FIG. 1 is a schematic representation of one embodiment of the components of the multimedia content presentation system of the present invention.

The present invention is directed to a multimedia content presentation system and method for creating a hierarchical N×M matrix of multimedia display cells (tiles) and for associating multimedia content and hierarchical navigation data with those display cells. The system and method also provides for navigating the hierarchical matrix of multimedia display cells and consuming multimedia content associated with those cells and sorting multimedia content within the hierarchical N×M matrix. The system and method of the present invention further provides for the recording and storing of hierarchical N×M matrix navigation data and multimedia content consumption data.

The potential of the system of the present invention as a content presentation and promotion application are limitless. Numerous applications of the multimedia content presentation system exist, including using the system as: (i) an electronic, interactive program guide (IPG) for broadcast and on-demand digital TV; (ii) an Internet video portal for on-demand do-it-yourself show clips; (iii) a promotional tool for broadcaster and cable programmers; and (iv) a viewer retention tool for show creators and networks.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as a method, data processing system, or computer (microprocessor based) program product. Accordingly, the present invention may take the form of an entirely hardware embodiment, an entirely software embodiment, or an embodiment combining software and hardware aspects. Furthermore, the present invention may take the form of a computer program product on a computer-usable storage medium having computer readable program code means embodied in the medium. Any suitable computer readable medium may be utilized including, but not limited to, hard disks, CD-ROMs, optical storage devices, and magnetic storage devices.

The present invention is described below with reference to illustrations of methods, apparatus (systems), and computer (microprocessor based) program products according to an embodiment of the invention. It will be understood that each function of the invention can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including an instruction apparatus that implements the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

As shown in FIG. 1, implementation of the multimedia content presentation system solution 30 includes preparation of the content by the preparation component sub-system 40, scheduling of the content presentation by the deployment component sub-system 60 and optional asset insertion sub-system 70, presentation of the content by the interface component sub-system 80 and reporting of user consumption and navigation choices by the metrics component sub-system 150. The multimedia content presentation system of the present invention is an on-the-fly (real time) entertainment compositing and promotion technology with targeted seamless ad-integration features which allows viewers to determine the course of their entertainment experience as well as the advertisements for which they are presented. Relevant entertainment segments and targeted advertising may be scheduled and inserted on-the-fly based upon viewer demographics (if collected by the subscriber) and entertainment genres consumed. The system may utilize currently available or yet to be developed transmission or broadcast systems 50, such as the Internet; terrestrial, satellite or cable television systems; and land-line or wireless phone systems.

Figure 2:
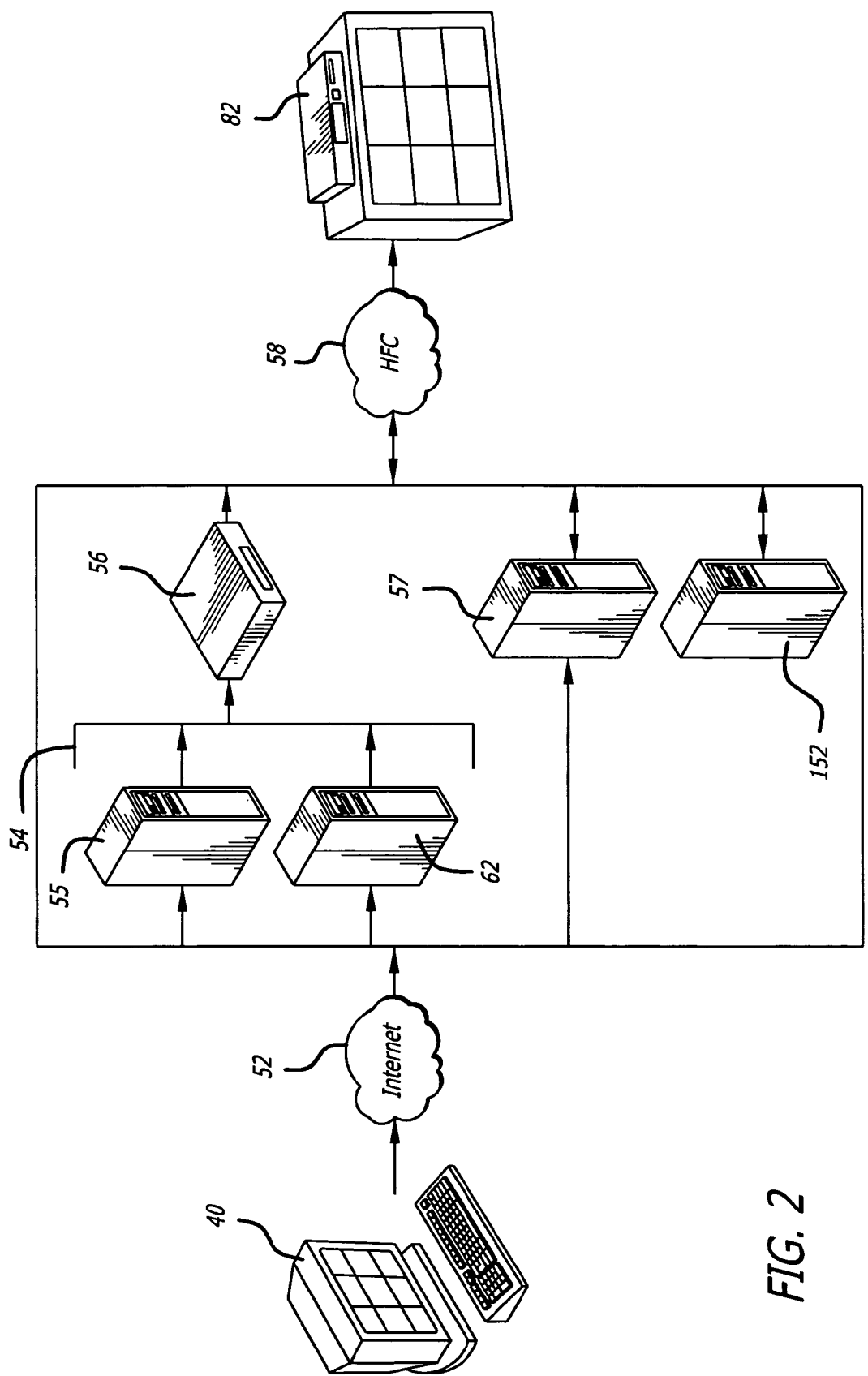
FIG. 2 is a schematic representation of one embodiment of the components of the multimedia content presentation system of the present invention, directed to a cable TV network.
Figure 3:
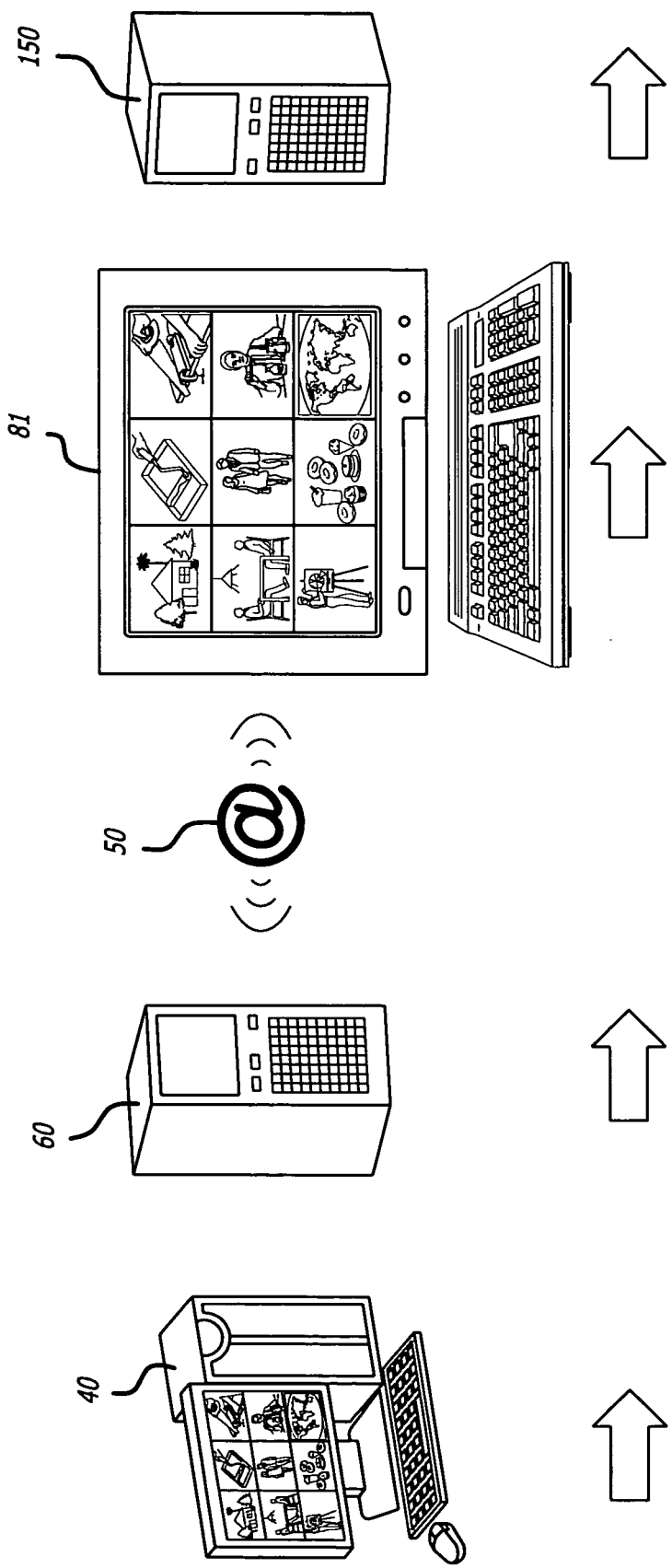
FIG. 3 is a schematic representation of one embodiment of the hierarchy of the display palettes used within the interface component of the multimedia content presentation system of the present invention.

The present multimedia content presentation system 30 leverages multimedia content delivery technologies to provide unique and compelling entertainment and advertising experiences to viewers. As shown in FIG. 1, the system looks and behaves consistently across platforms (e.g., personal computer 81, television 82, cell phone 83 and PDA 84) as an N×M matrix of display cells. For example, the interface component 80 may display and promote content identically within a 3×3 matrix of display tiles 100. An example of the system components for a cable TV portal in accordance with the present invention is shown in FIG. 2. In such a cable system, the preparation component 40 may use an Internet connection 52 to interface with the cable headend 54 that contains a broadcast server 55 and a deployment component server 62. The cable system may further include a video multiplexing subsystem 56, and communicate with the interface resident application 82 via a hybrid fiber coaxial (HFC) network 58. An example of the system components for an Internet portal (e.g., broadband network) in accordance with the present invention is shown in FIG. 3. In such an Internet system, the preparation component 40 and deployment component 60 may use an Internet transmission system 50 to interface with a resident application 81 of the interface component 80 that is configured to provide usage data to the metrics component 150.

Figure 4:
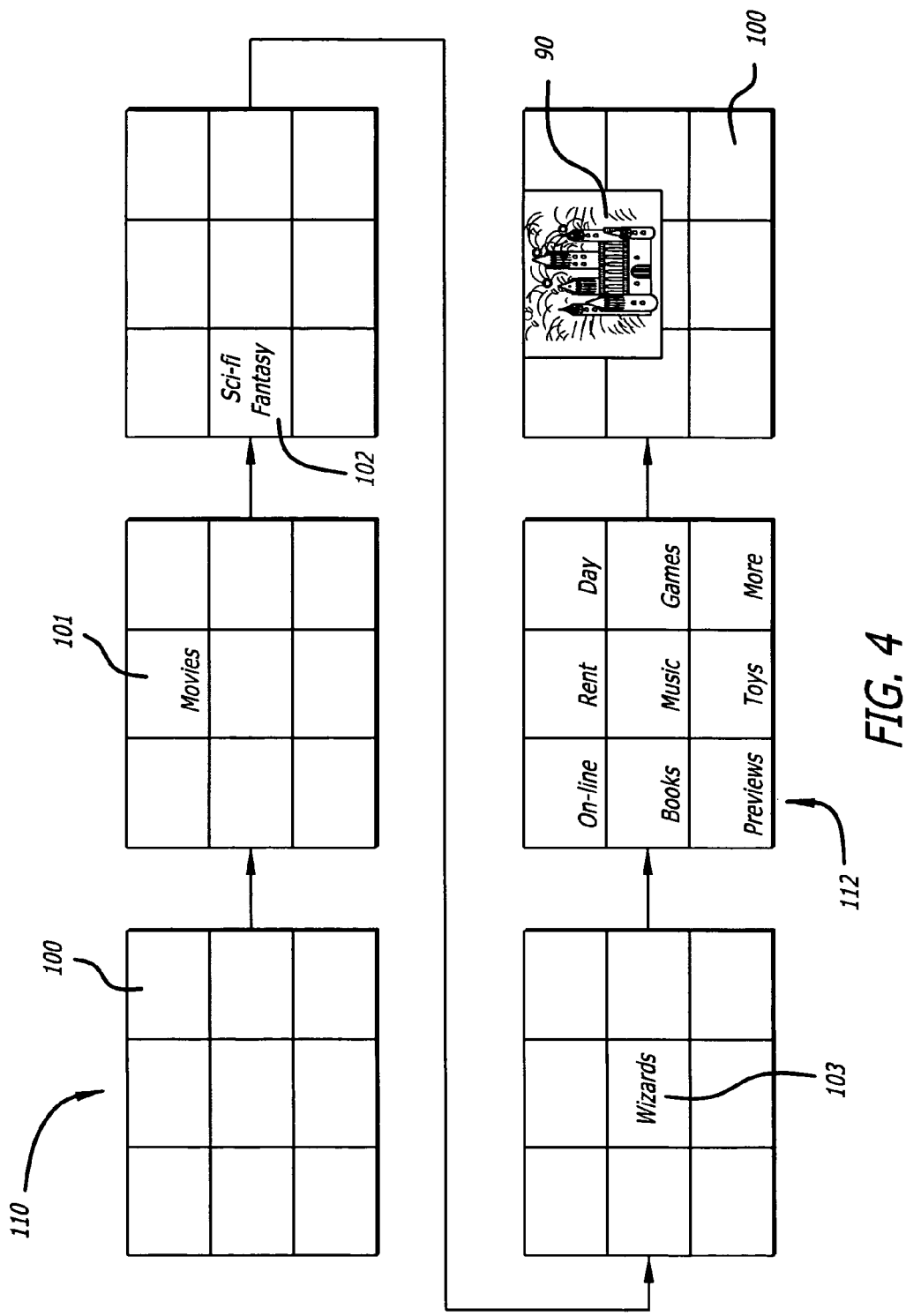
FIG. 4 is a schematic representation of one embodiment of the components of the multimedia content presentation system of the present invention, directed to a broadband system.

An example multimedia navigation application having a hierarchy of display tiles 100 configured within a display palette 110 in accordance with the present invention may look and behave as shown in FIG. 4. For example, one of the higher-level display tiles may be a "movies" subsection 101 that has a further "science-fiction and fantasy" subsection 102 that has a further "wizards" subsection 103. The content associated with any particular subsection of the matrix hierarchy may be included in a final or intermediate display palette 112. Selected content may be viewed in an expanded window or viewport 90. The interface component 80 may further provide spatial context transitional overlays as the user moves from one level (display palette) of the matrix to the next hierarchy level of display tiles.

Figure 17:
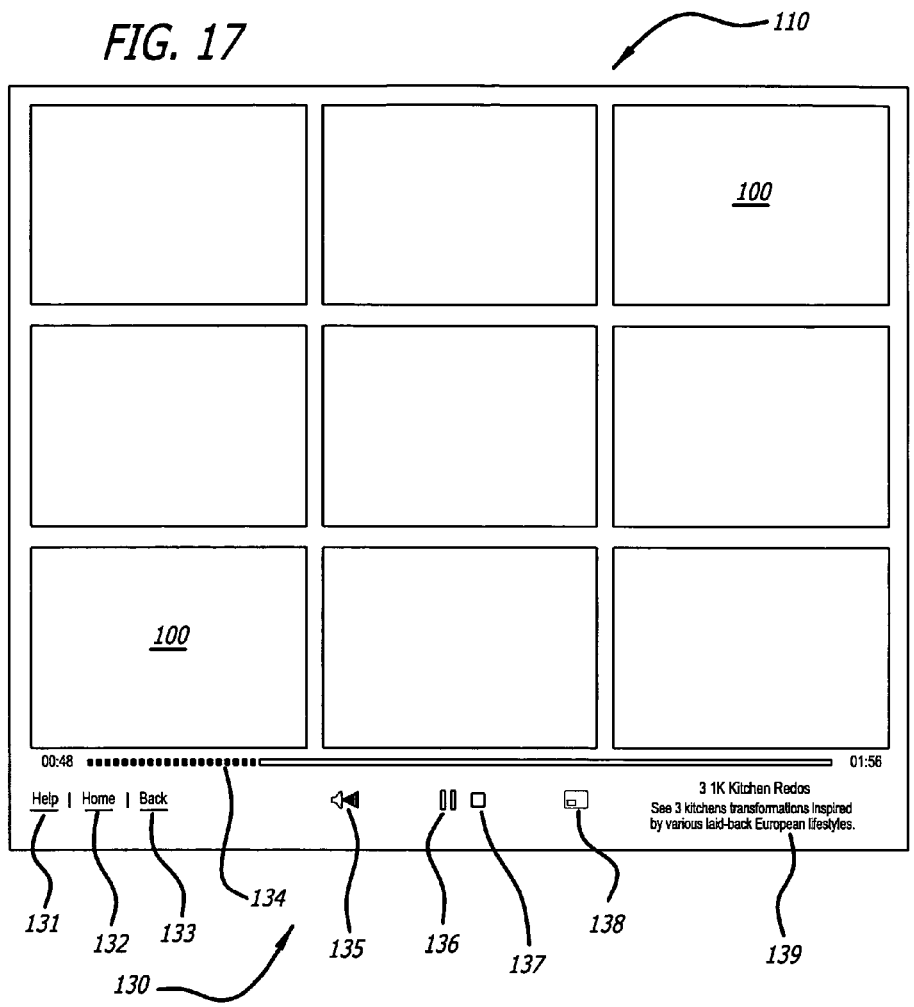
FIG. 17 is a schematic representation of one embodiment of the display palette used within the interface component of the present invention, depicting a navigation bar.

A hierarchical N×M matrix of multimedia display cells 100 is a very efficient and enjoyable way for users to search and sort through vast amounts of multimedia content. Users are presented with an initial N×M matrix of images within display cells (see FIGS. 9-11). An information or navigation bar 130 may also be presented to the user to aid the user in accomplishing relevant tasks, such as selecting navigation options, operating multimedia playback controls, accessing contextual help, or searching and sorting the content choices within the hierarchical matrix. If screen real estate is limited, then the navigation bar may pop-up and overlay the bottom portion of the display palette 110. If screen real estate is not limited, then the information bar may be positioned below the N×M matrix of display cells, as shown in FIG. 17.

Figure 14:
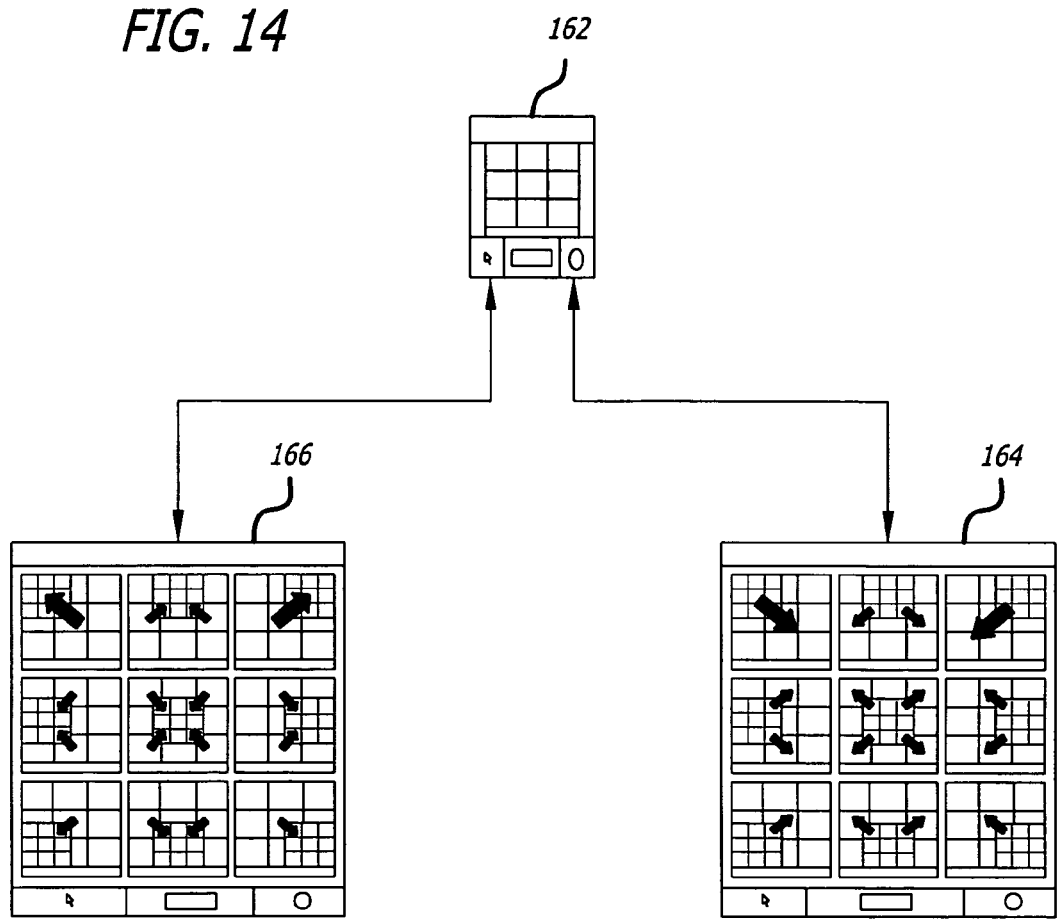
FIG. 14 is a schematic partial representation of the navigation sub-system of the interface component of the present invention.

Utilizing the capabilities of the relevant input device (e.g., PC keyboard/mouse, cell phone keypad, television remote control, etc.), users are able to navigate the hierarchy of multimedia content by selecting display cells and are then either transitioned to a new N×M matrix hierarchical level or are able to view multimedia content associated with a specific display cell. Transitional animations between hierarchical levels offer the user a sense of spatial context within the overall N×M hierarchical matrix (see FIG. 14).

Given the infinite nature of the drill-down navigation schema supported by the hierarchical N×M matrix of multimedia display cells, users can efficiently search through unlimited media assets. The content filtering capabilities of a hierarchical N×M matrix are exponential in nature. The magnitude of content filtered at any one level of the hierarchical N×M matrix is represented by the following formula:

$$(N \times M)^{(level\#)}$$

Figure 15:
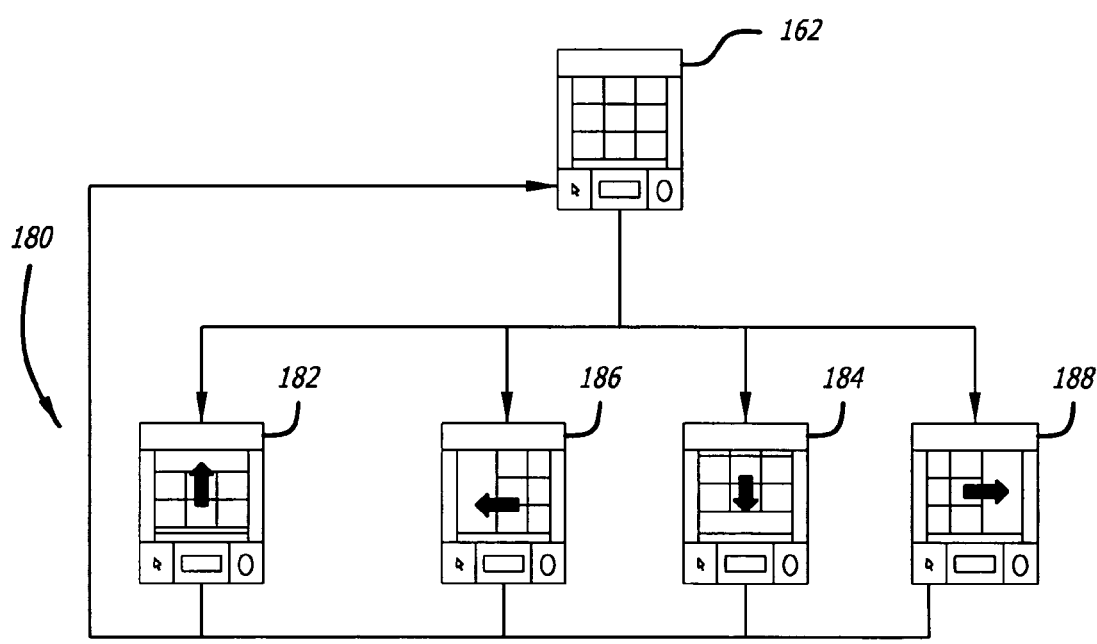
FIG. 15 is a schematic partial representation of the vertical and horizontal scrolling sub-system of the interface component of the present invention.

Using a 3×3 hierarchical matrix as an example, once a user has drilled down through three categorical (e.g., Movies-> Search by Genre->Genre Types) levels of the hierarchy, they have effectively eliminated a potential of 729 (9×9×9=729) choices of media. A fourth drill down through another categorical level, eliminates 6,561 choices, while yet a fifth choice eliminates 59,049 choices—and so on, ad infinitum. This calculation does not include other media choices made available at the same hierarchical level via horizontal or vertical scrolling navigation options when media choices exceed the standard N×M choices offered in a hierarchical level (see FIG. 15).

The end-to-end system solution that enables the provisioning, presentation, and measurement of multimedia content within a hierarchical N×M matrix of display cells may include: (i) a client application for presentation of the N×M hierarchical matrix of multimedia display cells; (ii) a provisioning tool which creates the configuration files and templates for multimedia content presentation within the hierarchical levels of the N×M matrix; (iii) a configuration file server which schedules and delivers the configuration files to the client application; and (iv) a measurement tool which stores the usage and content consumption data delivered to it by the client application.

The client application that presents the N×M hierarchical matrix is a shell that can be dynamically populated by multimedia content and a hierarchical navigation schema based upon a series of N×M matrix definition files. The client application is efficient in that it loads a matrix definition file only if the display cell with which the matrix definition file is associated is selected. This approach conserves device memory and lessens the initialization time of the application in that it does not have to load all matrix definition files upon startup—it only loads the matrix definition files that it utilizes based upon the navigation pathways taken by the user. The systems and methods of the present invention utilized to provision, present multimedia within, and measure usage of the hierarchical N×M matrix of multimedia display cells is described further herein.

Figure 5:
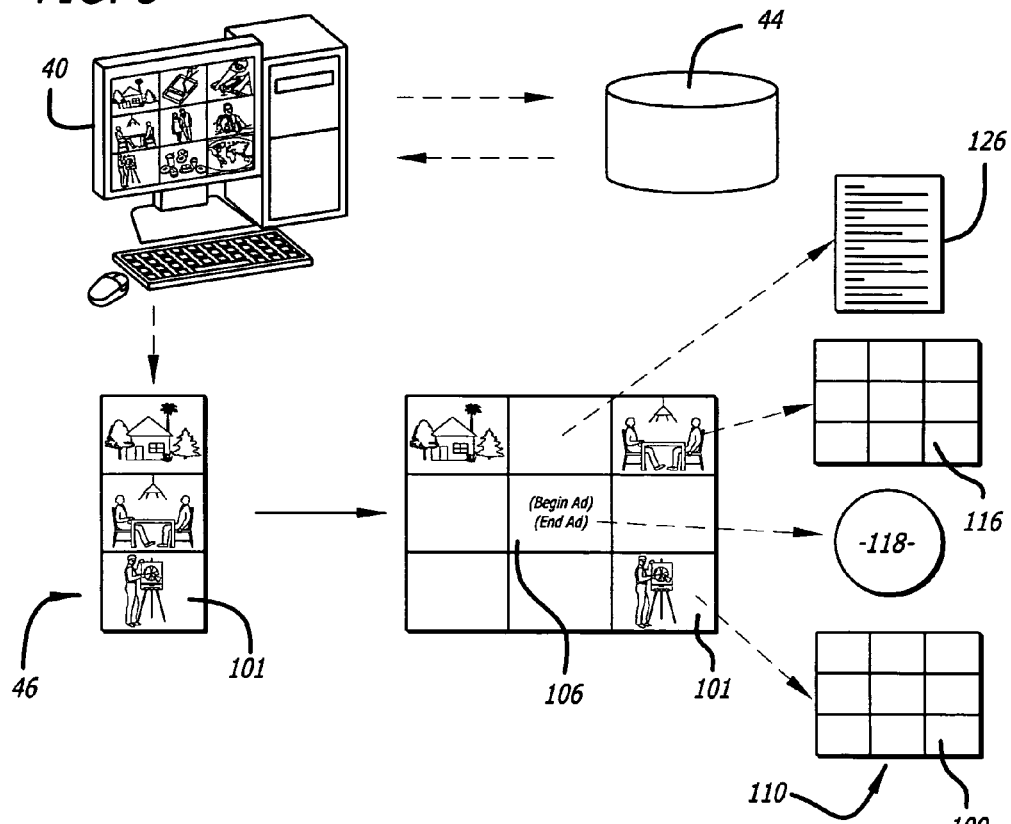
FIG. 5 is a schematic representation of one embodiment of the preparation component of the multimedia content presentation system of the present invention.
Figure 7:
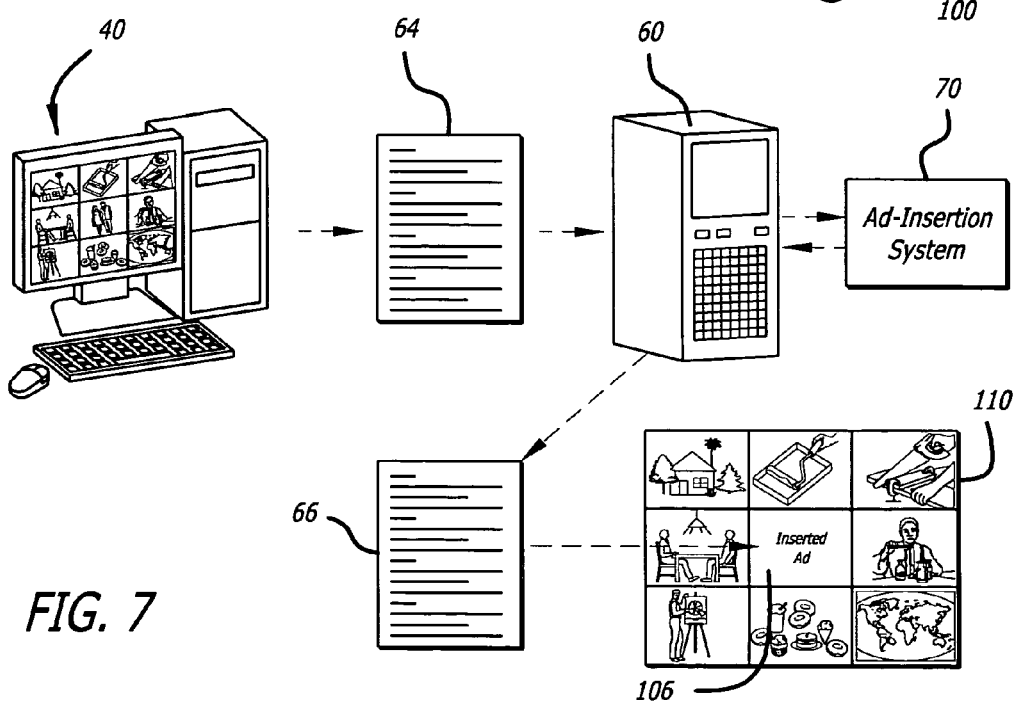
FIG. 7 is a schematic representation of an alternative embodiment of the preparation and deployment components of the system of the present invention, depicting an advertisement insertion sub-system.

Referring now to FIG. 5, the preparation component 40 of the multimedia content presentation system 30 of the present invention utilizes the following process in order to build a hierarchical N×M matrix of multimedia display cells. First, an empty N×M matrix data structure 110 is created with a unique identifier and an optional indicator of non-standard transitional animation type, for example, vertical scrolling or horizontal scrolling, rather than the default hierarchical expansion/contraction. Second, sources of multimedia asset metadata (for example, text descriptions, synopsis, title, rating and price data) are accessed and presented for assignment within the N×M matrix data structure. Next, the user uses the preparation component to create any dynamic content provisioning templates (palettes) 114 that will be required (see FIG. 6). As an option, the system assigns an additional transitional animation type (often used for advertising) from the sources of multimedia assets to the N×M matrix data structure.

Figure 19:
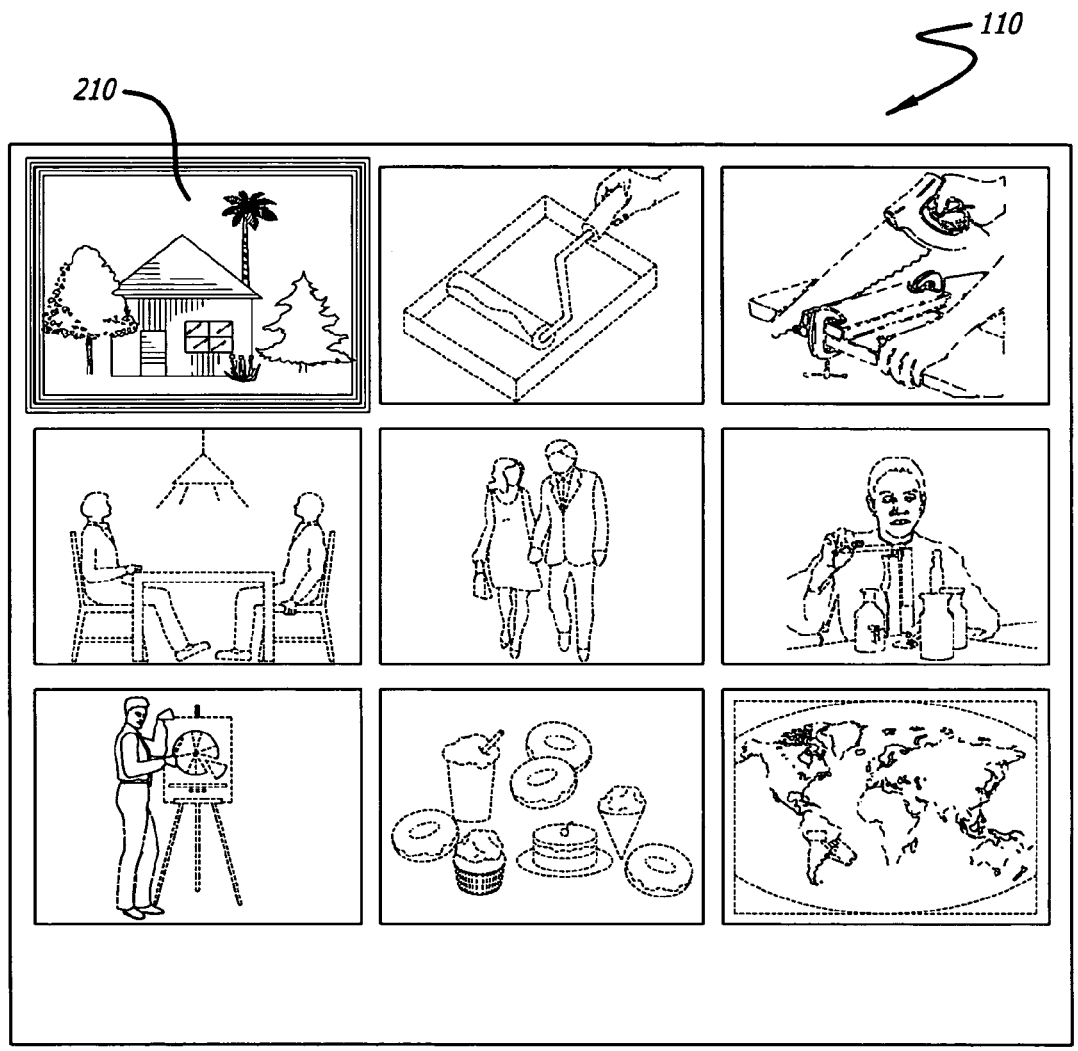
FIG. 19 is a schematic representation of one embodiment of the display palette used within the interface component of the present invention, depicting a selected display tile.

The preparation component 40 is further used to specify certain properties for each display cell 100 in the N×M matrix data structure. For example, the positional data in an N×M matrix is defined, and imagery files from the list of multimedia asset resources 46 are selected to represent a content category or a multimedia asset in both color and duotone imagery files (see FIG. 19). Textural information may also be specified to be overlaid on the imagery associated with display cells.

The preparation component 40 may also specify the properties for one of the following selected assets: (i) the location/identifier data for another static N×M matrix definition file to be loaded upon selection of the display cell; (ii) the identifier for a pre-defined dynamic content provisioning template 114 along with parameters (identifier and filters for the content source) that will allow a dynamic N×M matrix definition file to be generated by the configuration file server 62 upon selection of the display cell (see FIG. 6); (iii) the multimedia asset playlist 126 including both ordinal and location information for each multimedia asset to be played upon selection of the display cell; (iv) the location/identifier data for another application to be launched (e.g., game application) upon selection of the display cell; or (v) the location/identifier for a dynamic content link 118. The preparation component may also be configured to specify the type of the selected asset for conditional processing purposes or otherwise process the selected asset.

The preparation component 40 may be configured to repeat this process as necessary to create all N×M matrix definition files 64 that represent the hierarchical N×M multimedia matrix. In addition, the preparation component may be used to package all related N×M matrix definition files together, to deliver them to the configuration file server 62, and to schedule them for activation.

As shown in FIG. 6, the preparation component 40 may be configured to provide dynamic content provisioning templates 114 that are updated from content sources 48 in real time by the deployment component 60. Such templates are utilized when the amount of content to be provisioned is so great that it would be extremely tedious to manually create static N×M multimedia matrix definition files for each set of content assets to be presented. Dynamic content provisioning can occur at both the N×M multimedia matrix level 116 and the individual content display cell level 108 by utilizing user history data 154 from the metrics component 150. Dynamic content can include personalized targeted content, targeted advertising and other promotional media.

The first step in deploying content in the multimedia content presentation system 30 is to prepare all of the assets to be delivered to the interface component 80. These assets include display tiles 100 and media files 126 (e.g., video, audio, etc.) that need to be formatted for the content decoding and presentation capabilities of the user device having an interface component resident application. Considerations include supported media de-compression techniques as well as display resolution and color depth capabilities of the user device. Once all multimedia assets are prepared or formatted, then they are ready for processing by the preparation component 40.

The preparation component 40 is a "drag & drop" formatting tool that plugs into an organization's content management system 44. The preparation component formats media assets 48 (e.g., audio & video content) from the content management system for presentation within the interface component 80. The user interface of the preparation component mimics the N×M presentation matrix of the interface component as well as its hierarchy. The steps that an operator of the preparation component undertakes in order to deploy multimedia content are: (i) assign unique identifiers (Media Asset IDs) to media assets from the content management system; (ii) place duo-tone imagery (e.g., show poster art) within the display tile positions of the hierarchical levels of the interface component; and (iii) associate display tiles 100 either with media playlists 126 composed of media asset IDs and URLs, or with the interface component hierarchical levels for navigation purposes.

When the preparation component operator is satisfied with the association of display tiles 100 and media assets, he/she will use preparation component 40 to create a configuration file 64 (see FIG. 20). The configuration file governs the placement of display tiles within the interface component hierarchy and N×M matrix presentation layer (display palettes 110), as well as the association of media assets and display tiles. Then that configuration file, as well as the display tiles associated with it, will be published to the deployment component server 62. Configuration files can use any available file format for representing configuration data. For example, XML may be used for presenting a configuration file in accordance with the present invention.

The deployment component 60 is a multimedia content deployment tool that serves up multimedia assets, such as display tiles 100 and configuration files 64, across disparate networks to interface component 80 client applications. The multimedia solutions of the present invention are network agnostic in that they can be designed to work across a diverse array of network environments including the Internet, television service provider networks, and wireless networks. Depending upon the nature of the network, different transport mechanisms will be employed to accomplish content delivery. For example, a digital television network having a DSM-CC carousel within an MPEG-2 transport stream could be used for content delivery to enabled set-tops, while in an Internet network, TCP/IP could be used for content delivery.

The multimedia content presentation system 30 can also be designed to work across "push" or "pull" content delivery systems with or without local content storage. The deployment component 60 may further utilize ad tags or markers in the metadata to link to dynamic content. Similarly, the system may utilize a so-called "redirect URLs" to dynamically provide different content to the same display tile 100. Those of ordinary skill in the art will know how to utilize various systems and methods currently known and developed in the future to dynamically provide content to the display tiles.

Figure 8:
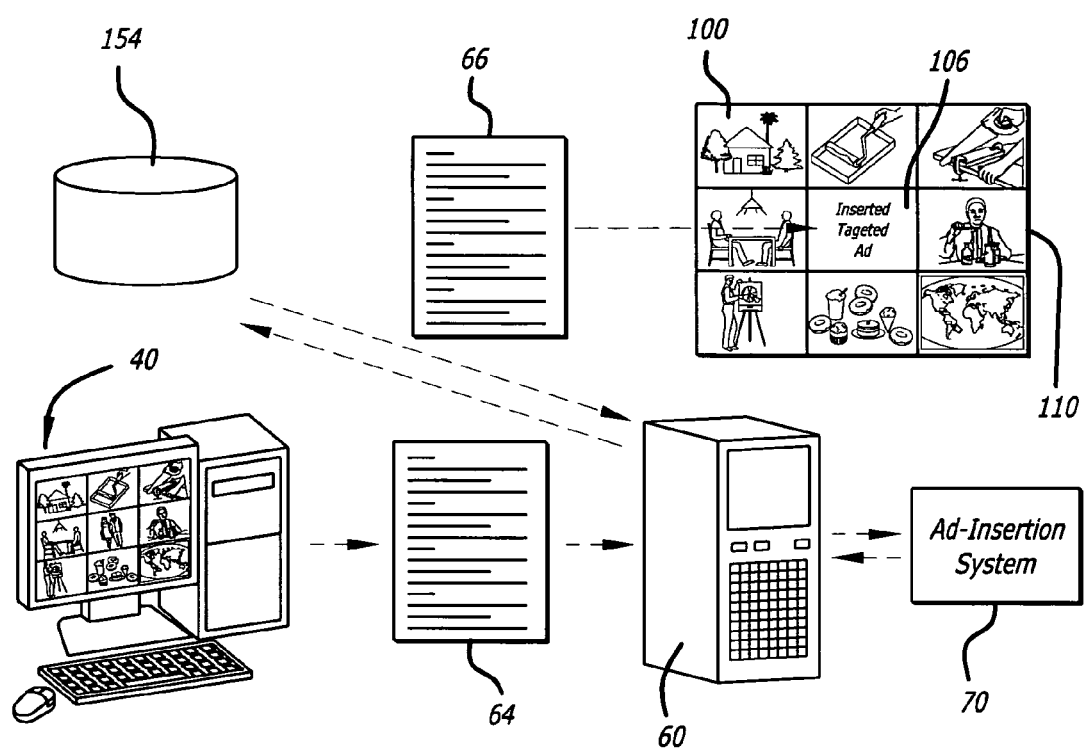
FIG. 8 is a schematic representation of an alternative embodiment of the preparation and deployment components of the system of the present invention, depicting an advertisement insertion sub-system that utilizes data from the metrics component sub-system.

For more sophisticated deployments, the deployment component 60 can dynamically construct configuration files 64, 66 on-the-fly based upon profile data 154 of the requestor that can contain audience demographics (if collected) or media consumption patterns collected by the interface component 80 and provided to the metrics component 150. Applications of this capability include targeted content delivery and targeted advertising (FIG. 8). Such targeting may be accomplished through multicasting or unicasting the configuration files and display tiles 100 to the intended resident interface component application. Such resident applications may be identified through a unique application point of consumption identifier (e.g., application or interface device) that is stored in the local file system of a device enabled with the multimedia content presentation system 30 of the present invention.

The deployment component 60 also has access to a database table with a list of advertising assets to be served up. A third party ad-insertion system may use an XML-based application program interface (API) to send a list of advertisement or targeted content spots to the deployment component server and it becomes part of that table. The API includes information on whether the ads/content are targeted to a specific group or, if non-targeted, where they are to be placed within the hierarchy of display palettes 110.

As shown in FIG. 8, the deployment component 60 can dynamically modify the configuration file 64 that has been sent to it from preparation component 40 to provide a revised configuration file 66 that references any of the dynamic advertisements within the advertising table. If ads or content assets are targeted, a media consumption profile 154 generated by the metrics component 150 is compared to the intended target profile for a particular ad and, if a match is made, then that specific advertisement 106 is included in the configuration file by the advertisement insertion sub-system 70. Additional capabilities include the ability to dynamically update the configuration file or portions thereof via an event trigger for updates sent to the interface component application from deployment component. In addition, mechanisms, such as redirect URLs may be used to dynamically update the specific content provided to the interface component.

Figure 9:
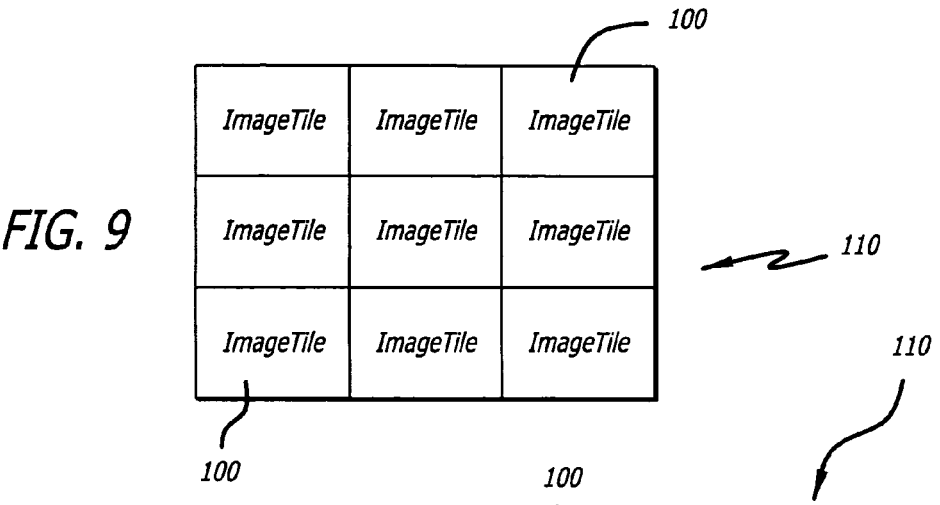
FIG. 9 is a schematic representation of one embodiment of a display palette used within the interface component of the present invention.
Figure 10:
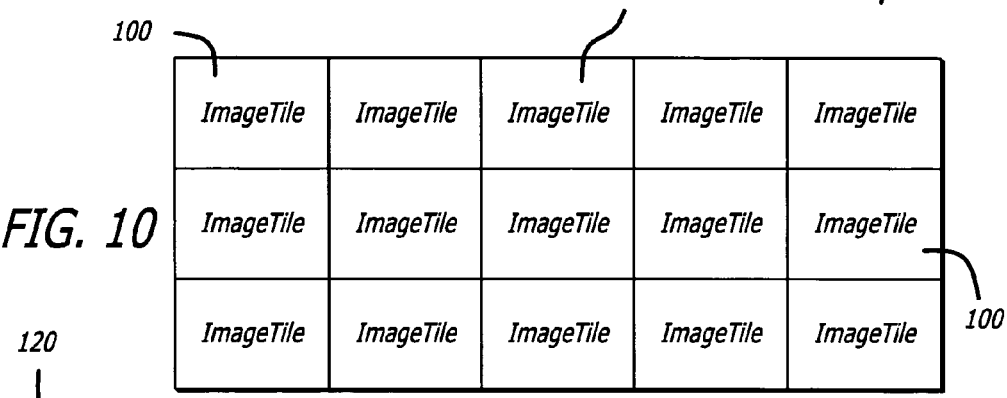
FIG. 10 is a schematic representation of an alternative embodiment of a display palette used within the interface component of the present invention.
Figure 11:
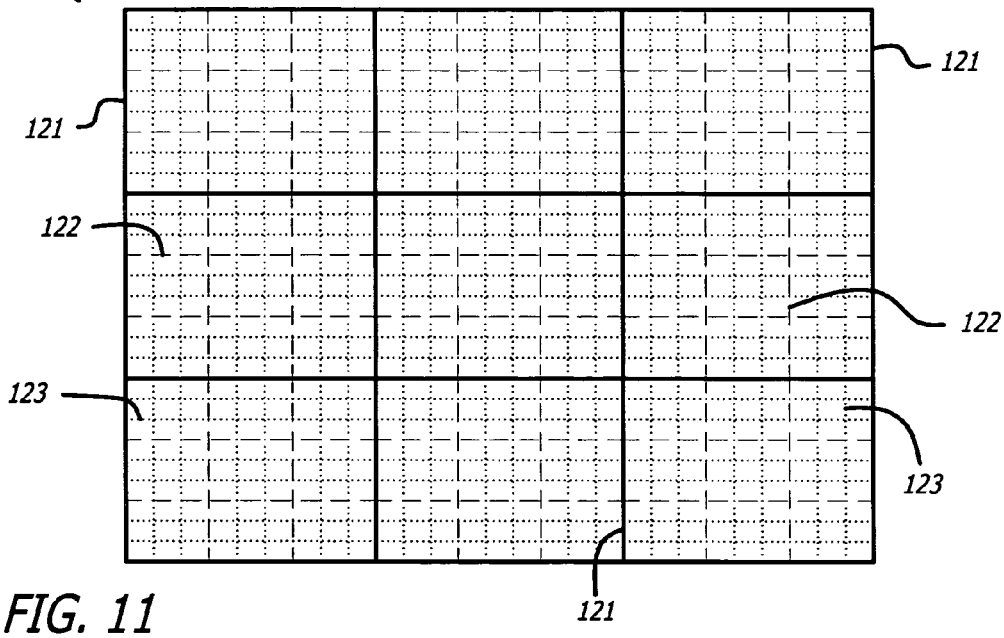
FIG. 11 is a schematic representation of one embodiment of the hierarchy of the display palettes within the user interface of the present invention, depicting a matrix of 3×3 display tiles.
Figure 12:
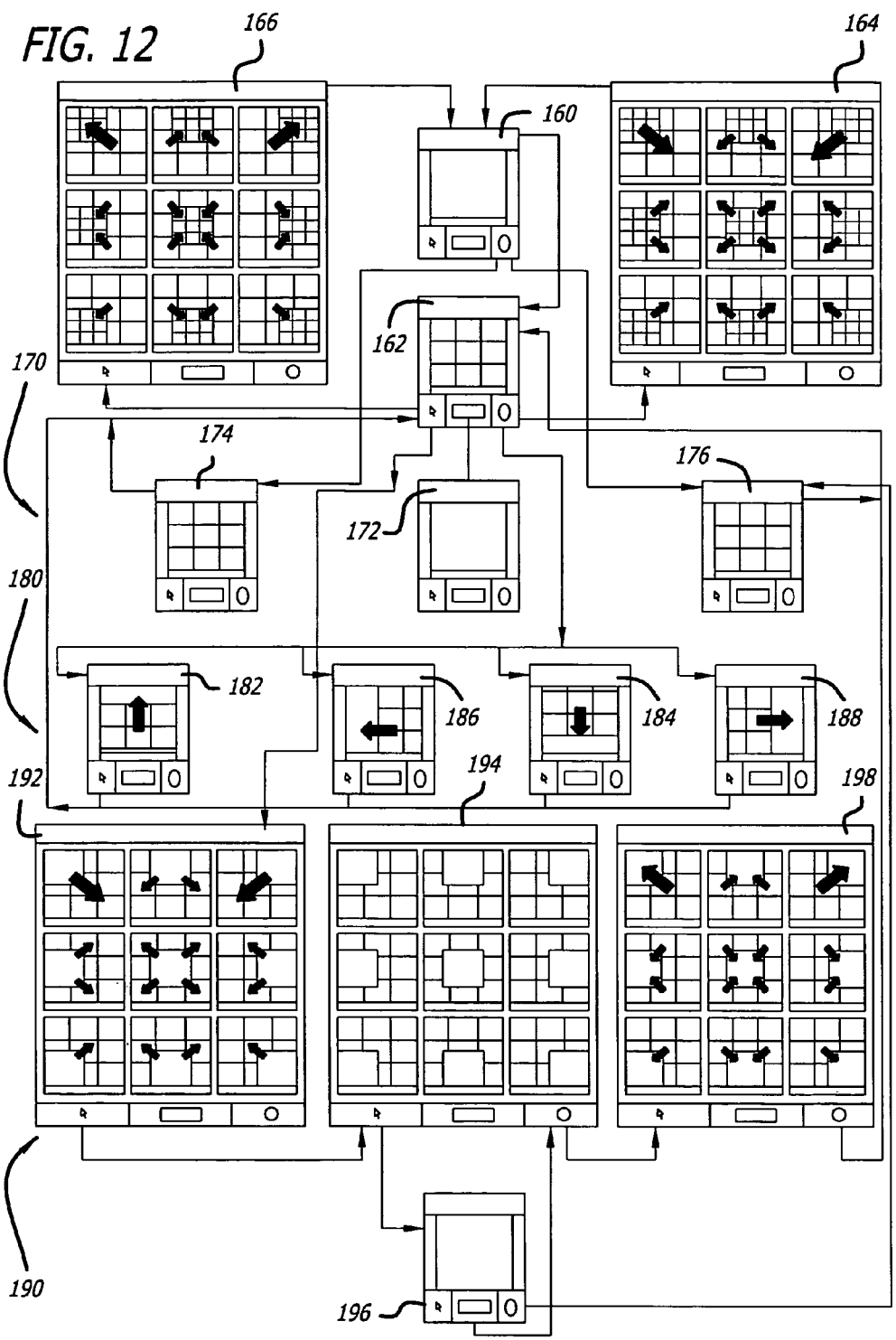
FIG. 12 is a schematic partial representation of the various states of the display palettes of one embodiment of the interface component of the present invention.
Figure 13:
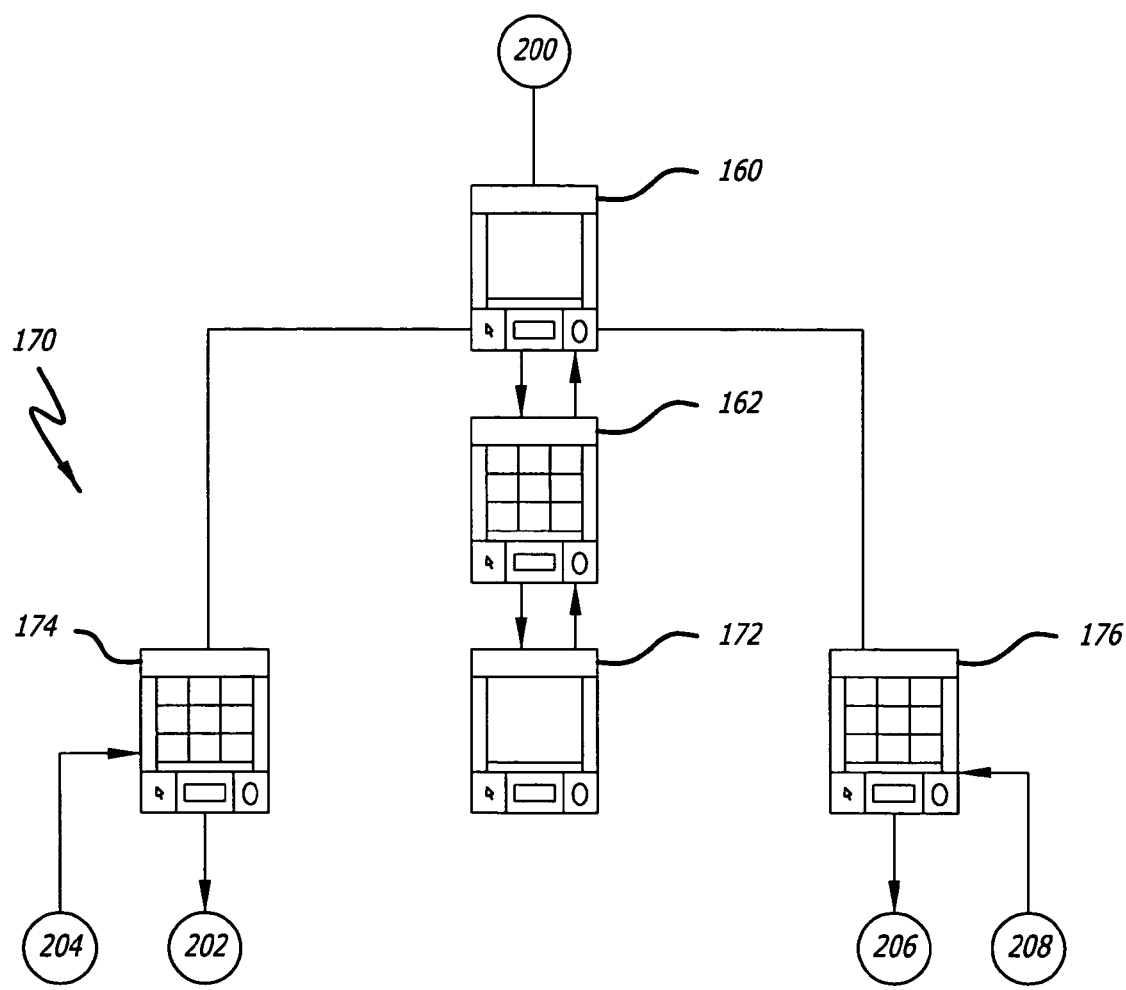
FIG. 13 is a schematic partial representation of the help and error sub-systems of the interface component of the present invention.

Referring now to FIGS. 9-11, the interface component 80 of the multimedia content presentation system 30 of the present invention is configured for presenting the hierarchical N×M matrix 110 of multimedia display cells 100. In one embodiment, the interface component 80 is configured to read the initial N×M matrix definition file, load the assets specified in the definition file for presentation and monitor the user input device(s) for executable commands. As shown in FIGS. 12-16, the interface component may follow a process flow that will highlight a cell if an input device is currently focused on display cell (FIG. 19), and load new N×M matrix definition file if display cell is selected and cell metadata specifies that a new N×M matrix definition file should be loaded. The interface component may also load default transitional animations or non-default transitional animations (if specified) and/or multiple transitional animations or other content, such as advertisements. The interface component may also be configured to play multimedia assets if a display cell is selected and the cell's metadata specifies that a list of assets should be played. Similarly, the interface component may launch or present an associated application (e.g., a game player) if a display cell is selected and the cell's metadata specifies that such an application should be launched.

The interface component 80 of the present invention may also be configured to sort multimedia content within a hierarchical matrix of multimedia content display cells having N rows and M columns, where N and M may be from 1 to infinity. When users get to the content display levels of the N×M hierarchical matrix, they may be able to initiate different orderings of the content being displayed. For example, a user may wish to see the latest releases of content and would therefore initiate a time/date ordering of the content presented. Then, they may wish to view it in alphabetical order and would therefore initiate that type of ordering. Finally, the system, through its monitoring of user multimedia consumption habits, would be able to present a content ordering according to most frequently consumed media types. Algorithms to implement such sorting are within the knowledge of those of ordinary skill in the art.

Utilizing the input capabilities of a device enabled with the multimedia content presentation system 30 of the present invention, viewers can navigate the hierarchical levels 164, 166 of the interface component 80 and view various media assets. Given the infinite nature of the drill-down navigation schema supported by the interface component, viewers can search through unlimited media assets. When viewers select a display tile 100 within a display palette 110, they can either be presented with the playback of associated media assets, or they can be taken to the next level 162 of the interface component N×M matrix hierarchy. When a display tile is selected, the display tile expands outward, and media assets are played within the video viewport 82 created by the display tile expansion. To aid viewers in the navigation of the interface component hierarchy and associated options, a navigational tool or bar 130 may slide up and over the lower display tiles or be displayed below the lower display tiles (see FIG. 17) to provide viewers with information on their options at that level of the hierarchy.

Figure 16:
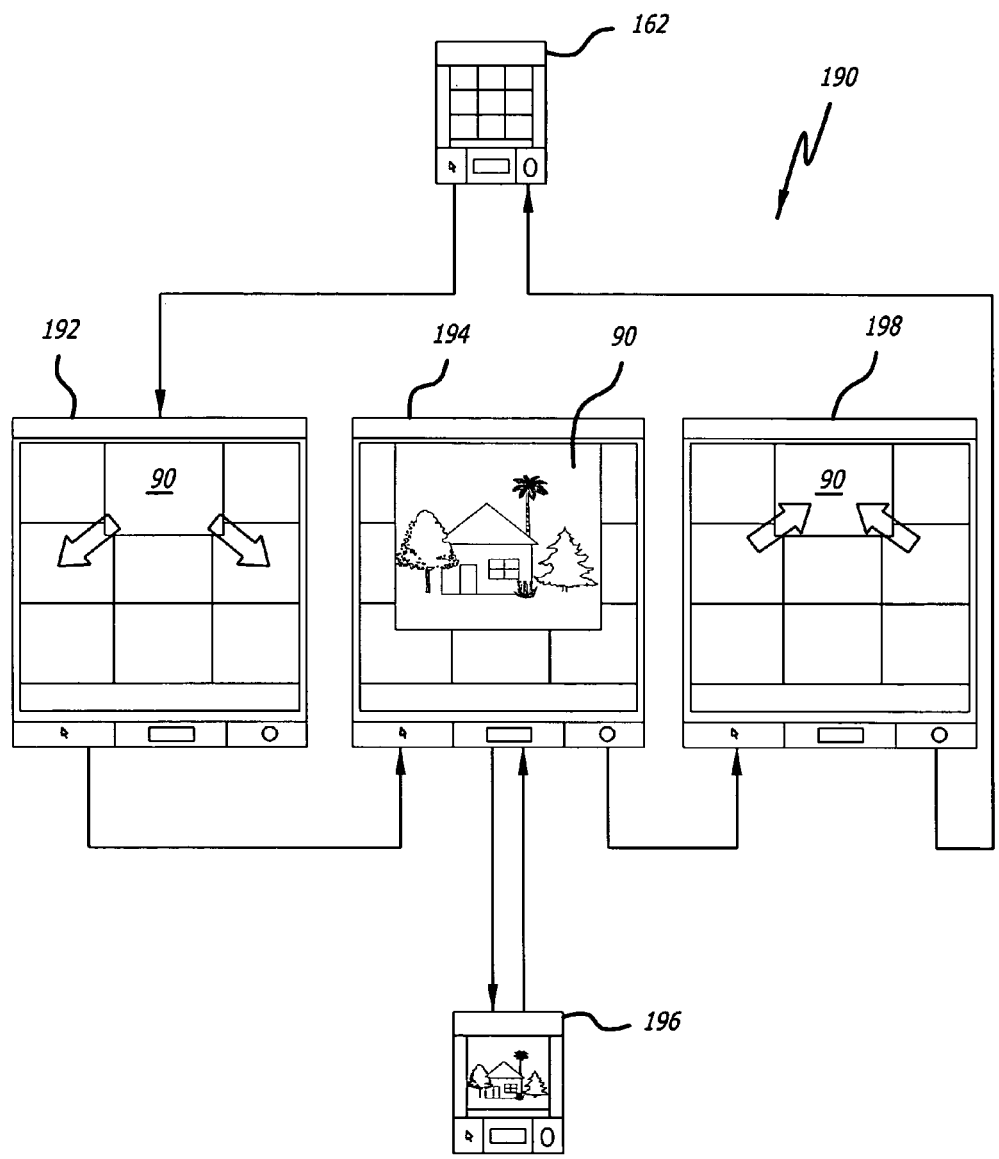
FIG. 16 is a schematic partial representation of the content display sub-system of the interface component of the present invention.

Referring now to FIGS. 12-16, the content filtering capabilities of the interface component 80 yield quick access to desired media assets. For instance, once a viewer has drilled down through three levels of the matrix hierarchy, they have effectively eliminated a potential of 729 (9×9×9=729) choices of media. A fourth drill down, eliminates 6,561 choices, while yet a fifth choice eliminates 59,049 choices—and so on, ad infinitum. This calculation does not include other media choices made available at the display palette level via horizontal or vertical scrolling navigation options (see FIG. 15) when media choices exceed the standard nine choices offered in a 3×3 display palette 110. An example of the results of a drill down through the levels of the interface component hierarchy is shown in FIGS. 4 and 16.

The content and advertising presentation technology of the interface component 80 of the multimedia content presentation system 30 of the present invention is a shell that can be dynamically populated by content and advertising based upon a dynamic configuration file 64. The interface component reads the configuration file to determine what content and advertising will be placed within each display tile 100 of each display palette 110. The interface component further reads the configuration file to determine the media asset IDs and locations of that content and advertising, as well as where (the hierarchical level, square, or transitional spot) the content will be placed and presented within the matrix.

Once all configuration data has been loaded into the user's interface component 80 resident application, the data can be manipulated according to various sorting algorithms that are presented as options to viewers at various levels of the display hierarchy. For example, media assets can be presented to viewers in: (i) alphabetical order; (ii) time/date order; or (iii) according to most frequently consumed media assets. Other options that can be selected from the navigation bar 130 include the ability to record and store content on a local storage device. When such an option is selected a specialized level of the interface component is provided that allows viewers to navigate and manage their recorded media assets.

Referring to FIGS. 12-16 by way of example, a device (e.g., computer, television, PDA, cell phone) is activated and the multimedia user interface 160 is displayed on the device screen. A three to five second brand opening sets the interface and content subject matter in place. The viewer sees an N×M matrix of grayscale imaged tiles labeled with text. The viewer uses their input device (e.g., PC mouse/keypad, TV remote control cursor/keypad, PDA touch-screen, cell phone keypad, etc.) to position the cursor over a single imaged tile within the N×M matrix of imaged tiles. Optionally, selecting 'Home' or '0' on the input device keypad may transition the viewer back to the previously shown display palette 110. The interface component 80 further provides a mechanism for drawing the attention of the user to the content choice being made, for example, using duotone and full-color swappable images. The highlighted imaged tile transitions from a grayscale to full color with a deeper level of visual and text information (see FIG. 19). Such images are displayed within a display cell in mutual exclusion to each other upon an input device focal event. The interface component may be configured such that when a display cell obtains focus (selected or rolled over by the user input device), a full color image 210 is displayed. The system may be further configured such that a duotone image is displayed when a display cell loses focus.

On selection of the full-color imaged tile, the viewer can be transitioned to a deeper level 190 of hierarchy within the multimedia interface, and can be shown a new set of N×M imaged tiles 100 in a display palette 110 that are related to the previously selected imaged tile. If the viewer is at the lowest level of the matrix hierarchy, then the imaged tile may expand 192 to one-quarter of full screen 194 and promote the subject matter within a video viewport 90. Further selection of the currently displayed content may cause the video viewport to expand to full screen 196 and play the selected subject matter.

Figure 21:
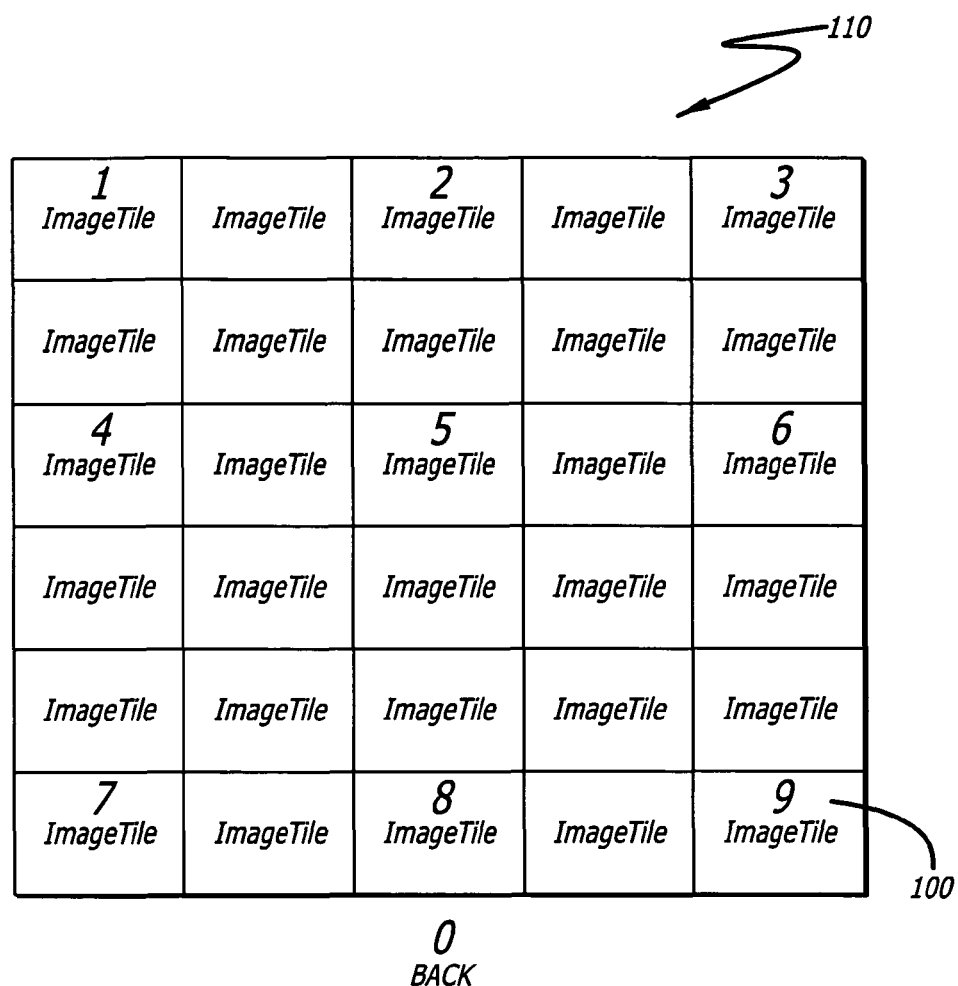
FIG. 21 is a schematic representation of an alternative embodiment of a display palette used within the interface component of the present invention, depicting the use of a numeric keypad to spatially navigate the display palette.

Referring to FIG. 16, the input device actions and the onscreen choices have been reduced to a minimum of nine patterned functions or choices. The remote, cell phone, and keyboard '1' through '9' keys relate directly to the on screen pattern of images in a 3×3 display palette 110 of display tiles 100. When selected, the '0' key may provide a 'Back' function to transition the user to the previous display palette. As shown in FIG. 21, the '1' through '9' keys may also be used to provide spatial navigation and accessibility in a display palette having more than nine display tiles. On a PC, the 'Home' key transitions the viewer to the top level of the matrix hierarchy and the 'Back' button transitions the viewer to the previously viewed N×M matrix of imaged tiles. Alternatively, keyboard cursor keys or remote control unit directional arrows may be used for vertical and horizontal scrolling 180 (see FIG. 15). The text may appear in an upper window 182, a lower window 184, a left side window 186 or a right side window 188. The multimedia content presentation system 30 of the present invention uses this "navigation patterning" function of the brain to give the user a consistent sense of location ('you are here') within the interface, programs, information, and processes. Moreover, the multimedia content presentation system looks and behaves consistently across platforms (e.g., PC, Television, PDA, cell phone) as an N×M matrix of choices. The interface component 80 displays and promotes content identically within the N×M matrix such that the functions remain the same across platforms. However, the interface component is configured to recognize and process commands from the various input devices (e.g., keyboard, keypad, mouse, cursor keys, and arrow keys) associated with each platform.

Content within the multimedia content presentation system 30 is presented within display tiles 100 that form a display palette 110 at each level of the hierarchy. A display tile may have the following properties to it: (i) position data in an N×M matrix; (ii) color poster URL; and (iii) black and white (duo-tone) poster URL. A display tile may also have a pointer to another display palette hierarchical level, or a media asset playlist consisting of media asset IDs and their associated URLs. A display palette may have the following properties to it: (i) a unique identifier for the display palette level; and (ii) a list of all display tiles within the display palette.

Referring now to FIG. 17, the interface component may include a navigation bar 130 associated with the display palette 110. When the multimedia content presentation system 30 of the present invention is used within a broadband cable network, the navigation bar may be configured to display a 'help' hyperlink 131, a 'home' hyperlink 132 that takes the user to the top display palette, and a navigational 'back' hyperlink 133. The navigation bar may further include a media playback progress bar 134, various multimedia controls (e.g., audio control 135, play/pause 136, stop 137, and full screen/maximize 138), and dynamic media asset information 139 (error messages, title text and descriptive text). Prior to the user navigating the interface component hierarchy, a logo identifying the network in use may be presented in the center of the navigation bar (not shown).

When the user begins to navigate the interface component matrix hierarchy by clicking on a display tile, the network logo disappears and is replaced with the PLAY/PAUSE toggle button 136 and the STOP button 137 for media control. Addition functions presented on the navigation bar may include a HELP button 131 that launches an interactive Help file in full-display palette resolution, a HOME button 132 that returns user to the Home display palette, and a BACK button 133 that returns user to the previous display palette. The navigation bar may further include a media playback progress bar 134, a volume control icon or button 135 for raising or lowering the volume level that may be accomplished by a single mouse click on either side of the volume control icon (e.g., left side for lower volume, right side to for higher volume).

The navigation bar 130 may further be configured with a full screen control button 138 for expanding and contracting the viewport 90. Alternatively, pressing a designated key(s) or button(s) on a user control device in full screen mode expands or minimizes the video viewport 90 from/to partial-palette resolution. The navigation bar may also contain a dedicated message display portion 139 for media clip descriptive text or error messages. If an error event 170 occurs while the user is navigating the interface matrix, the error message and its associated options may be displayed in the message display portion of the navigation bar. As the user begins navigating the matrix hierarchy 200, certain errors may occur, such as no configuration file found 174 or no content found 176. The system is directed to the error screens 204, 208 and after the message is displayed, back to the matrix 202, 206. The navigation bar may further be configured to provide functions for local storage of content, such as video clips and static images. Additionally, the navigation bar may provide an indication to the user of where in the matrix hierarchy the current display palette 110 resides ("you are here" feature).

Figure 18:
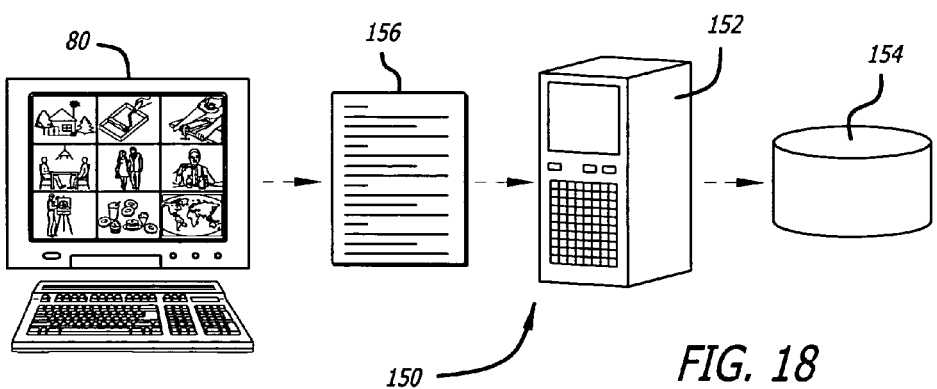
FIG. 18 is a schematic representation of one embodiment of the metrics component of the multimedia content presentation system of the present invention.

Referring now to FIG. 18, the metrics component 150 of the multimedia content presentation system 30 of the present invention is configured to provide hierarchical N×M matrix navigation data and multimedia content consumption data to the preparation component 40 and deployment component 60. Since a hierarchical N×M matrix of multimedia content display cells presents such a new media navigation paradigm to the end user, the metrics component may be configured such that usage data 154 is collected and analyzed to measure the effectiveness of each deployed navigation schema. As users navigate the hierarchical N×M matrix and consume media types, the interface component 80 may record information on media consumption and navigation choices and provide that data to the metrics component in the form of a log or other file 156. The metrics component may periodically send this information to a content consumption history server 152 where it may be stored for later analysis or used for dynamic content presentation.

The metrics component 150 may report data such as: (i) which hierarchical matrix navigation pathways are utilized most often; (ii) which user interface components are utilized most often; (iii) when users have opted into a multimedia segment; (iv) the average time spent on each multimedia segment; (v) which multimedia segments were most watched; and (vi) how many users accessed a multimedia segment, as well as when and how often. The information reported by the metrics component may allow entities that deploy a hierarchical N×M matrix of multimedia content display cells to hone their effectiveness at retaining viewers. Such reports may aid in generating qualified impressions for media and advertising presented within the hierarchical N×M matrix. The data also can be utilized to deliver targeted content to the end user through the dynamic content provisioning process (see FIGS. 6 and 8).

As viewers browse content while using the multimedia content presentation system 30, information on user content consumption and navigation choices is collected and compiled into a log file that is stored on the enabled device. That log file is intermittently transmitted to the metrics component server 152 on the other side of the network and stored in a database table. Metrics component media consumption log files can use any number of file formats for representing usage log data. For example, XML is a reasonable format for presenting a metrics component media consumption log file.

User usage information that may be recorded includes: (i) application ID; (ii) display palettes visited; (iii) display tiles selected; (iv) Media Asset ID for media consumed; (v) playback time for media consumed; and (vi) user control device events, such as keystrokes, cursor movements and mouse clicks.

Reports may be run against application IDs and Media Asset IDs to better understand individual content viewing patterns and aggregate user media consumption habits as well as to verify ad-deliveries for advertisers' paid spots. Over time, this information can be utilized to construct a viewer's media consumption profile that can become the basis for delivery of targeted media assets to an enabled device. As viewers navigate the multimedia content presentation system and consume media types, the interface component 80 records information on media consumption and navigation choices. Periodically this information is sent to the metrics component server 152 where it is stored in a database table.

While the specification describes particular embodiments of the present invention, those of ordinary skill can devise variations of the present invention without departing from the inventive concept.

We claim:

1. A method of deploying content comprising:
building a hierarchical N×M matrix having content filtering capabilities via a preparation component, wherein building comprises;
creating an empty N×M matrix definition file using a unique identifier;
accessing an at least one source of multimedia content assets;
forming a dynamic content provisioning template;
repeating the creating until all N×M definition files are created, the N×M definition files represent the hierarchical N×M matrix;
preparing the multimedia content assets to be delivered to the interface component, wherein the multimedia content assets include the display cells and media files;
making a configuration file, wherein the configuration file governs placement of display cells and associates with the multimedia content assets and the display cells, wherein the configuration file associates a plurality of properties for each display cell in the hierarchical N×M matrix, and wherein the display cells are sortable by each property of the plurality of properties;
publishing the configuration file to the deployment component;
serving multimedia content assets via a deployment component, wherein the steps comprising serving multimedia content assets are implemented on a programmable apparatus;
receiving the multimedia content assets at an interface component;
loading the multimedia content assets specified in the initial N×M matrix configuration file;
presenting the hierarchical N×M matrix on the interface component that displays the multimedia content assets reading an initial N×M matrix definition file;
monitoring at least one user input device; and
sorting at a client device all multimedia content assets within a level of the hierarchical N×M matrix when a different ordering is initiated by the user.

2. The method of claim 1, wherein the creating comprises using an indicator of non-standard transitional animation type.

3. The method of claim 1, wherein the accessing comprises presenting the multimedia content assets for assignment within the hierarchical N×M matrix.

4. The method of claim 1, wherein the properties include positional data, imagery files, and the multimedia content assets.

5. The method of claim 1, wherein the preparation component is a "drag and drop" formatting tool configured to format the multimedia content assets.

6. The method of claim 1, wherein the multimedia content assets comprise display tiles and configuration files.

7. The method of claim 1, wherein the deployment component is configured to dynamically construct configuration files.

8. The method of claim 1, wherein the deployment component is configured to dynamically construct profile data comprising media consumption patterns collected by the interface unit.

9. The method of claim 1, wherein the deployment component is configured to access advertising assets.

10. The method of claim 1, wherein the presenting further comprises loading default transitional animations.

11. The method of claim 1, wherein the interface component is configured to play the multimedia content assets.

12. The method of claim 1, wherein the interface component is configured to launch an associated application.

13. The method of claim 1, wherein the interface component is configured to the sort multimedia content assets within the hierarchical N×M matrix.

14. The method of claim 1, wherein the interface component comprises a content and advertising presentation technology configured to be populated based upon a dynamically configured file.

15. The method of claim 1, wherein the interface component comprises a navigation bar associated with a display palette.

16. The method of claim 1, further comprising navigating the hierarchical N×M matrix.

17. The method of claim 16, further comprising recording navigation data and multimedia content consumption in a log by the interface component.

18. The method of claim 17, wherein sending the log to a metrics component.

19. The method of claim 18, further providing the log to the preparation component and the deployment component by the metrics component.

20. The method of claim 16, further sending the log to a history server, the log is used for subsequent analysis.

21. The method of claim 1, wherein the interface component is configured to sort the multimedia content assets within the N×M matrix by at least one of date/time stamp and alphabetical order.

22. The method of claim 17, wherein the navigation data comprises one from the list: frequency of use of a pathway, frequency of use of the interface component.

23. The method of claim 17, wherein the consumption data comprises one from the list: occurrence of a user opting-in to a multimedia segment, average time spent viewing a multimedia segment, frequently of watching a multimedia segment, number of users accessing a multimedia segment.

* * * * *

UNITED STATES PATENT AND TRADEMARK OFFICE
CERTIFICATE OF CORRECTION

PATENT NO. : 8,453,175 B2
APPLICATION NO. : 10/856200
DATED : May 28, 2013
INVENTOR(S) : Reid et al.

It is certified that error appears in the above-identified patent and that said Letters Patent is hereby corrected as shown below:

IN THE SPECIFICATION
IN THE "DETAILED DESCRIPTION OF THE INVENTION" SECTION
　　　　At column 8, line 28, please delete the "." between the words "through" and "vast" so that the phrase correctly reads:

and sort through vast amounts of multimedia content.

IN THE CLAIMS
　　　　In Claim 13, at column 17, line 28, please delete the word "the" between the words "to" and "sort" and insert the word --the-- between the words "sort" and "multimedia content assets" so that the claim correctly reads:

13. The method of claim 1, wherein the interface component is configured to sort the multimedia content assets within the hierarchical N×M matrix.

In Claim 23, at column 18, line 27, please replace the word "frequently" with --frequency-- so that the claim correctly reads:

23. The method of claim 17, wherein the consumption data comprises one from the list: occurrence of a user opting-in to a multimedia segment, average time spent viewing a multimedia segment, frequency of watching a multimedia segment, number of users accessing a multimedia segment.

Signed and Sealed this
Sixth Day of August, 2013

Teresa Stanek Rea
*Acting Director of the United States Patent and Trademark Office*